(12) United States Patent
Yang et al.

(10) Patent No.: US 11,460,616 B2
(45) Date of Patent: Oct. 4, 2022

(54) METHOD OF FABRICATING DIFFRACTION GRATINGS

(71) Applicant: Magic Leap, Inc., Plantation, FL (US)

(72) Inventors: Shuqiang Yang, Austin, TX (US); Kang Luo, Austin, TX (US); Vikramjit Singh, Pflugerville, TX (US); Frank Y. Xu, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 93 days.

(21) Appl. No.: 16/930,940

(22) Filed: Jul. 16, 2020

(65) Prior Publication Data
US 2021/0041611 A1    Feb. 11, 2021

Related U.S. Application Data

(60) Provisional application No. 62/876,241, filed on Jul. 19, 2019.

(51) Int. Cl.
*G02B 5/18* (2006.01)
*G02B 27/01* (2006.01)

(52) U.S. Cl.
CPC ......... *G02B 5/1857* (2013.01); *G02B 5/1842* (2013.01); *G02B 27/0172* (2013.01); *G02B 2027/0125* (2013.01)

(58) Field of Classification Search
None
See application file for complete search history.

(56) References Cited

U.S. PATENT DOCUMENTS

| | | | |
|---|---|---|---|
| 6,524,756 B1 | 2/2003 | Wu | |
| 6,850,221 B1 | 2/2005 | Tickle | |
| 7,901,630 B2 | 3/2011 | Putman et al. | |
| 7,923,260 B2 | 4/2011 | Moon et al. | |
| 9,081,426 B2 | 7/2015 | Armstrong | |
| 10,481,317 B2 | 11/2019 | Peroz et al. | |
| 2004/0223156 A1 | 11/2004 | McGrew et al. | |
| 2006/0028436 A1 | 2/2006 | Armstrong | |
| 2006/0118514 A1* | 6/2006 | Little | B82Y 30/00 216/41 |
| 2006/0201909 A1* | 9/2006 | Pan | H05K 3/1275 216/41 |

(Continued)

FOREIGN PATENT DOCUMENTS

WO    WO 2021/016028    1/2021

OTHER PUBLICATIONS

International Search Report and Written Opinion for PCT Application No. PCT/US 20/42284, dated Oct. 19, 2020.

(Continued)

*Primary Examiner* — Shamim Ahmed
(74) *Attorney, Agent, or Firm* — Knobbe, Martens, Olson & Bear, LLP

(57) ABSTRACT

A method of fabricating a blazed diffraction grating comprises providing a master template substrate and imprinting periodically repeating lines on the master template substrate in a plurality of master template regions. The periodically repeating lines in different ones of the master template regions extend in different directions. The method additionally comprises using at least one of the master template regions as a master template to imprint at least one blazed diffraction grating pattern on a grating substrate.

20 Claims, 29 Drawing Sheets

(56) References Cited

U.S. PATENT DOCUMENTS

| | | | |
|---|---|---|---|
| 2007/0081123 A1 | 4/2007 | Lewis | |
| 2008/0265338 A1* | 10/2008 | Yu | H01L 29/7851 |
| | | | 257/397 |
| 2010/0062098 A1* | 3/2010 | Ando | G03F 7/0002 |
| | | | 425/385 |
| 2012/0001834 A1* | 1/2012 | Hudman | G02B 26/101 |
| | | | 345/13 |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0133791 A1 | 5/2016 | Smirnov et al. | |
| 2016/0231568 A1* | 8/2016 | Saarikko | G02B 5/1866 |
| 2018/0081265 A1 | 3/2018 | Singh | |
| 2020/0301062 A1* | 9/2020 | Young | G03F 7/0005 |

OTHER PUBLICATIONS

DeRoo, et al., "Line spread functions of blazed off-plane gratings operated in the Littrow mounting", Journal of Astronomical Telescopes, Instruments, and Systems, J. Astron. Telsc. Instrum. Syst. 2(2), 025001 (2016).

International Preliminary Report on Patentability for PCT Application No. PCT/US 20/42284, dated Jan. 25, 2022.

ARToolKit: https://web.archive.org/web/20051013062315/http://www.hiti.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality—Merging Real and Virtual Worlds," 2005 https://web.media.mit.edu/~raskar/book/BimberRaskarAugmentedRealityBook.pdf.

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

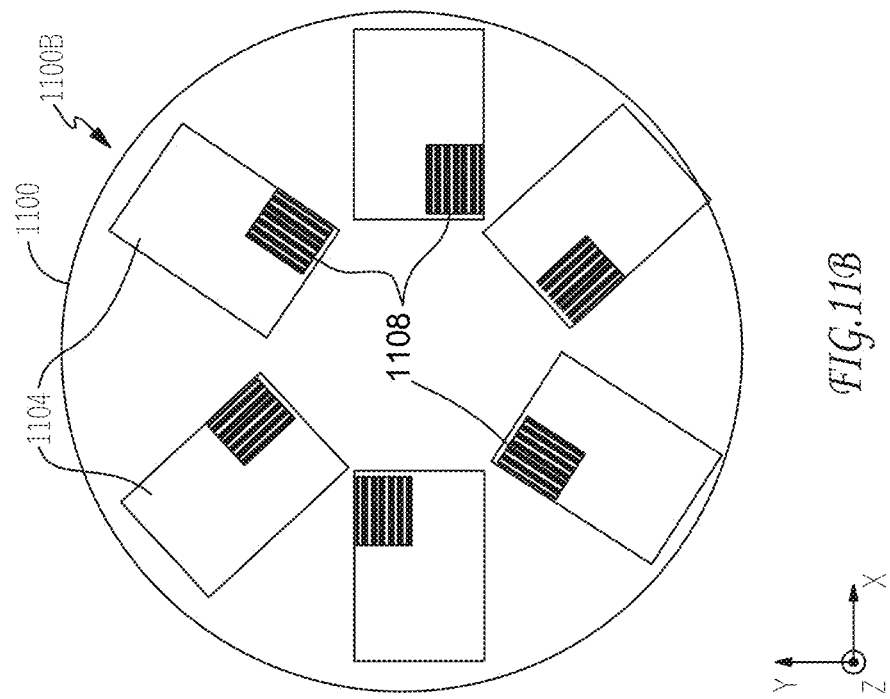
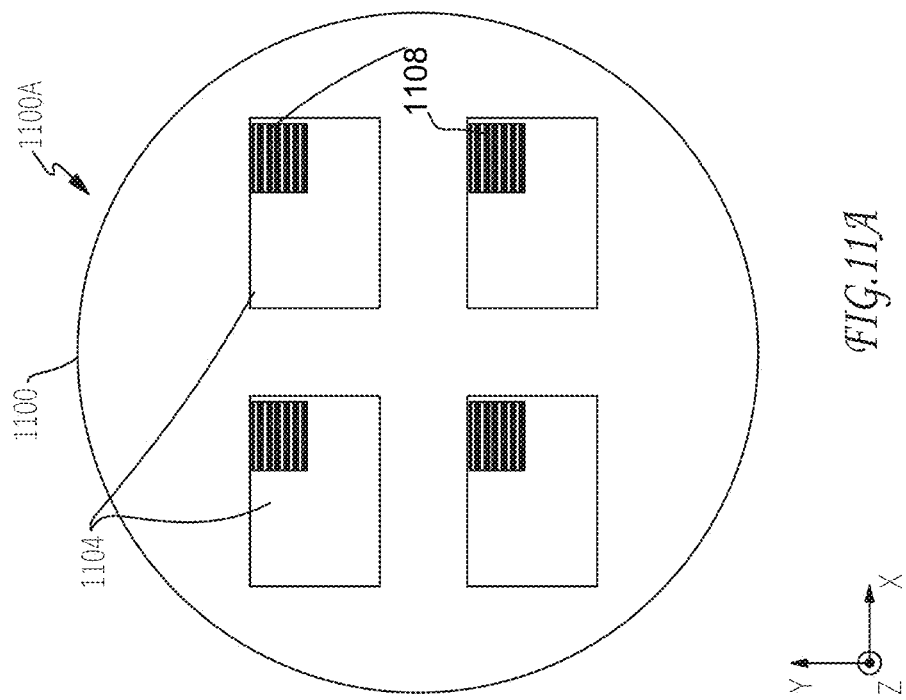

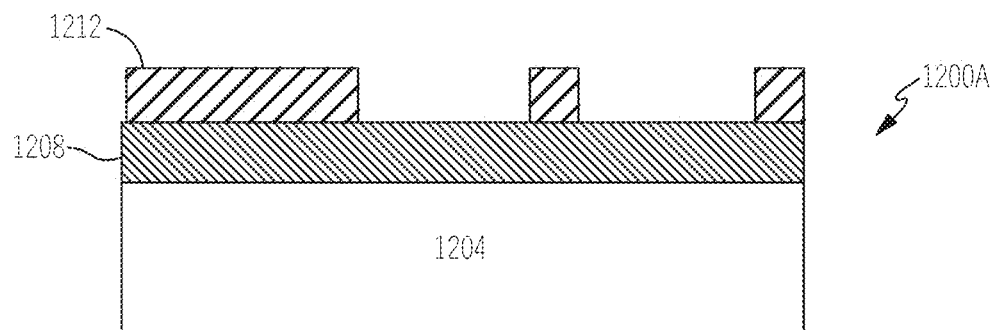
FIG.12A
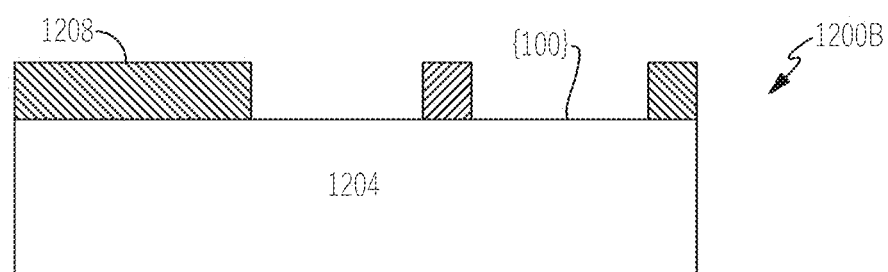
FIG.12B
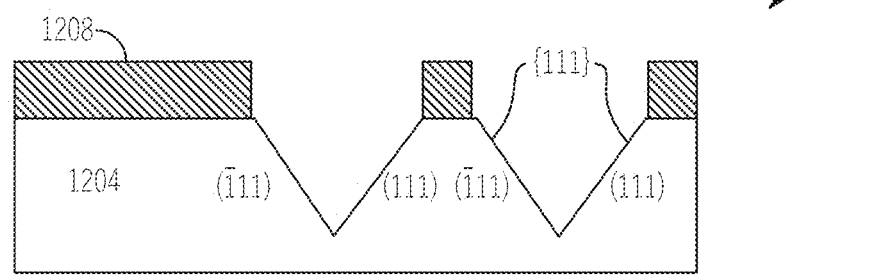
FIG.12C
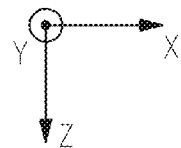

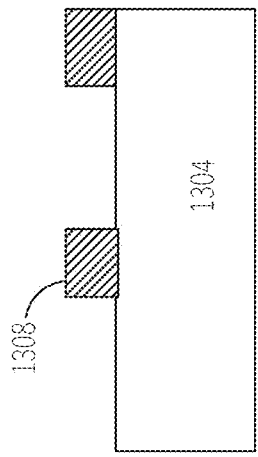
FIG. 15A
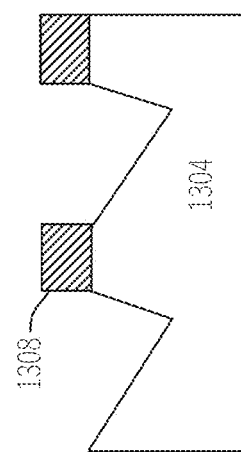
FIG. 15B
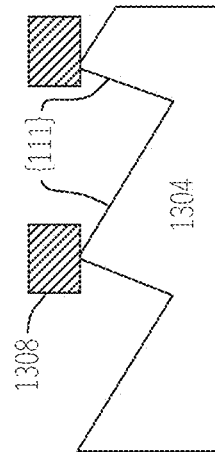
FIG. 15C
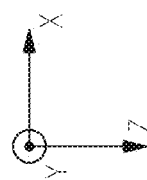
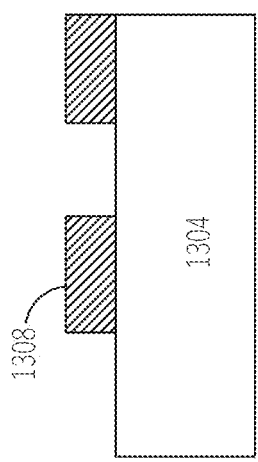
FIG. 14A
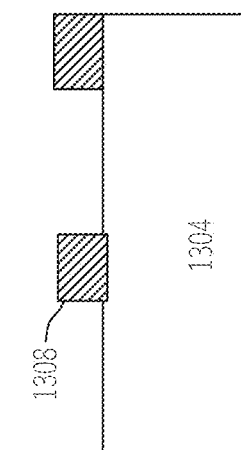
FIG. 14B
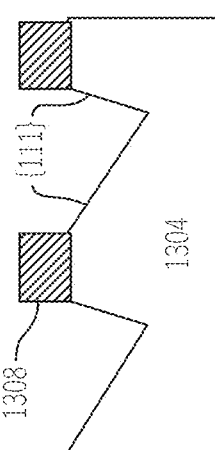
FIG. 14C
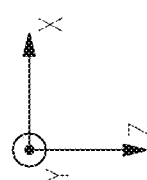

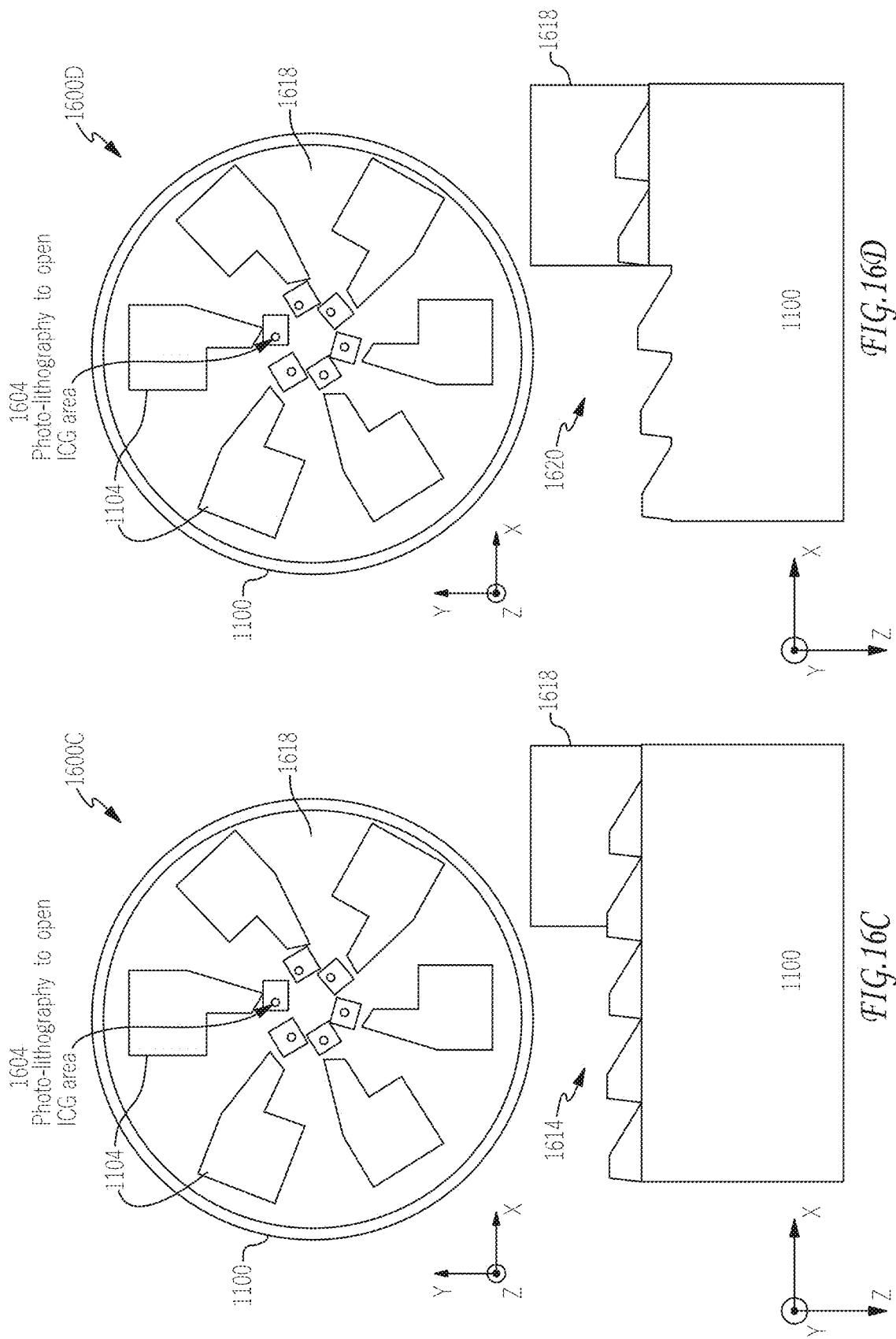

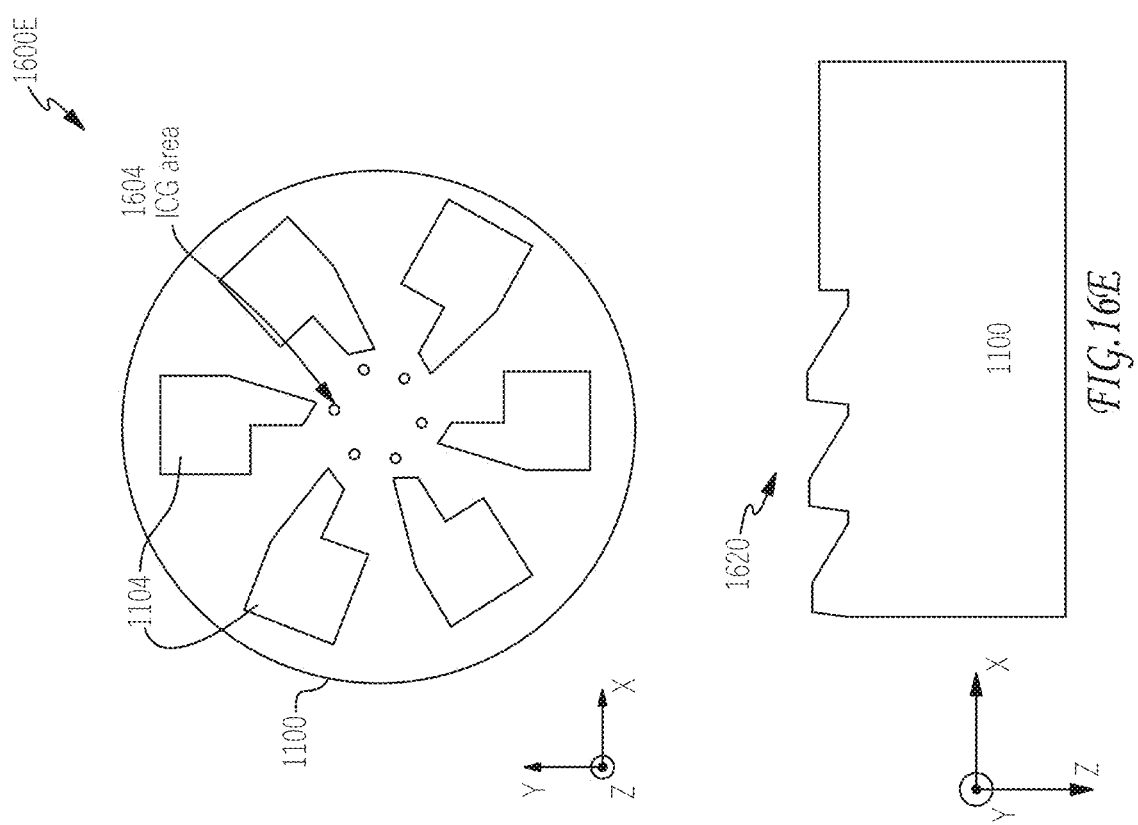
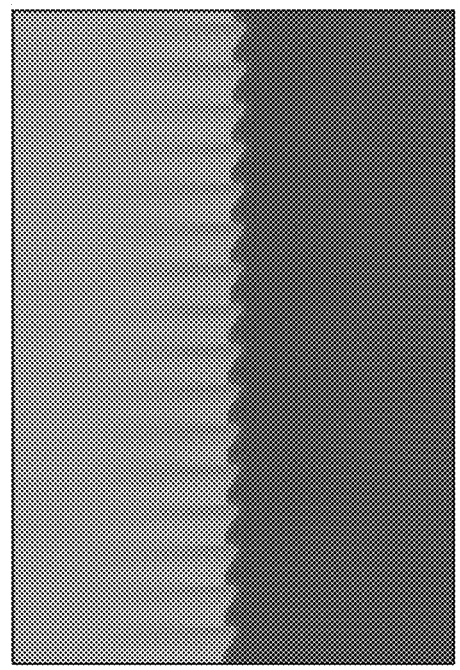
FIG. 16E
FIG. 16F

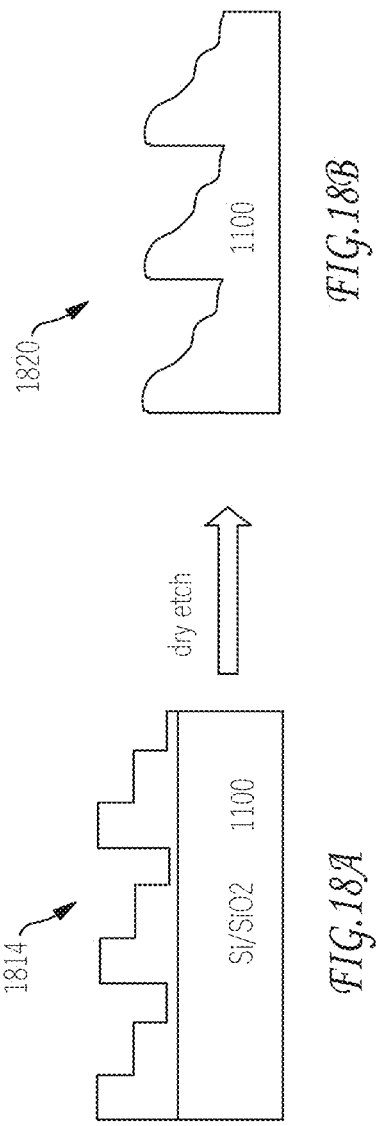

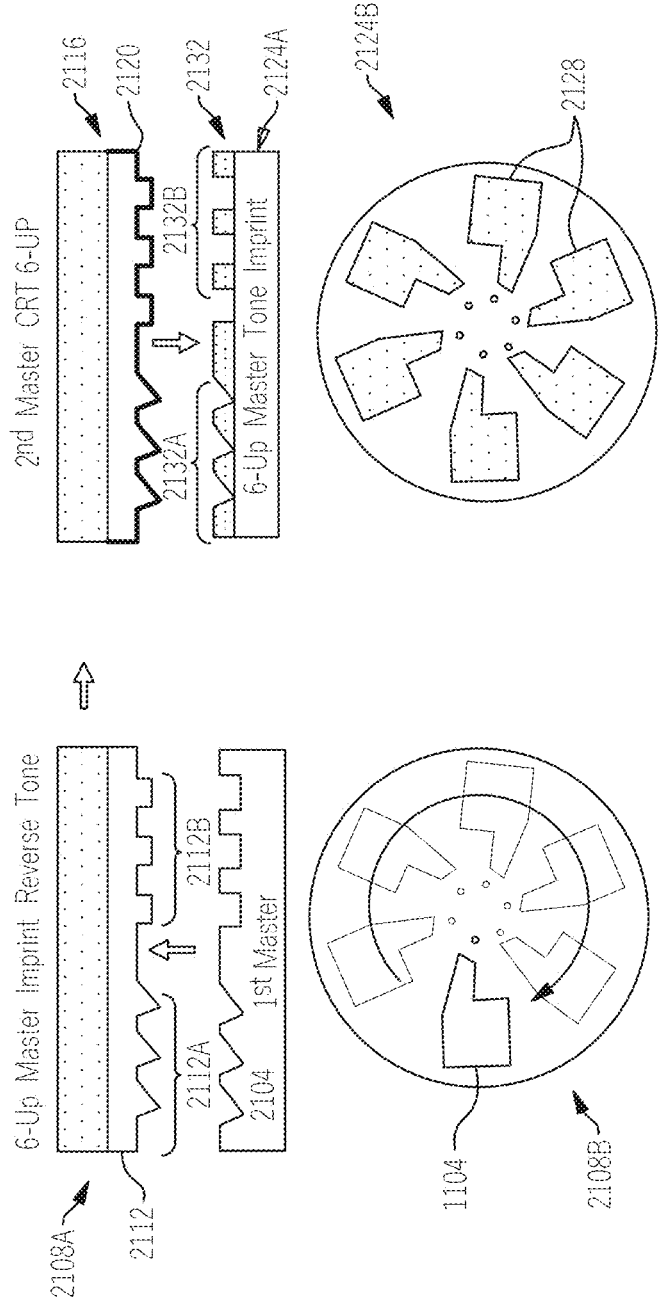

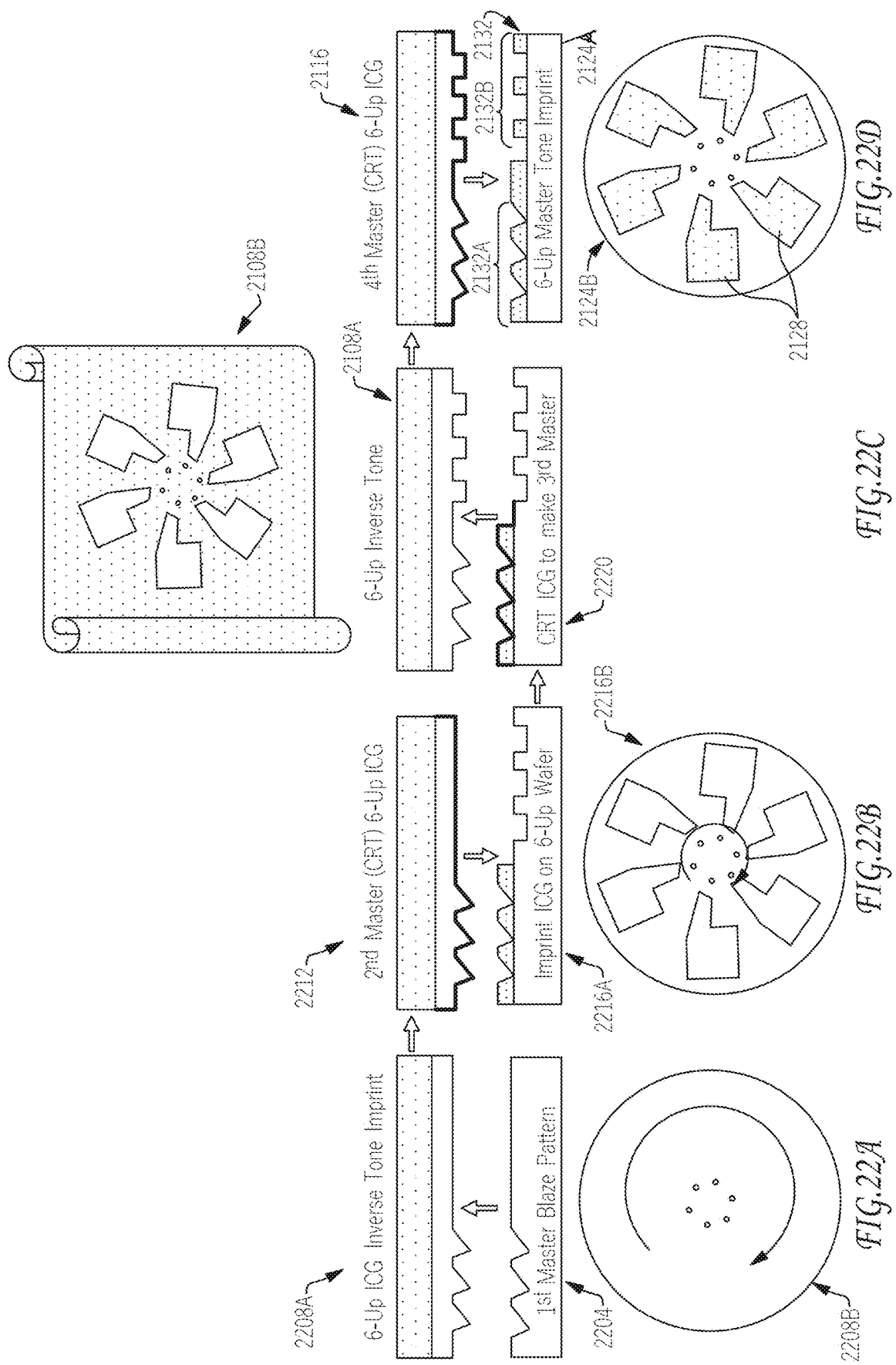

METHOD OF FABRICATING DIFFRACTION GRATINGS

CROSS-REFERENCE TO RELATED APPLICATIONS

This application claims the benefit of priority to U.S. Provisional Application No. 62/876,241, filed Jul. 19, 2019, entitled "METHOD OF FABRICATING DIFFRACTION GRATINGS," the content of which is hereby incorporated by reference in its entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; and U.S. application Ser. No. 14/331,218 filed on Jul. 14, 2014, published on Oct. 29, 2015 as U.S. Publication No. 2015/0309263.

BACKGROUND

Field

The present disclosure relates to display systems and, more particularly, to augmented and virtual reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In an aspect, a method of fabricating a blazed diffraction grating comprises providing a master template substrate and imprinting periodically repeating lines on the master template substrate in a plurality of master template regions. The periodically repeating lines in different ones of the master template regions extend in different directions. The method additionally comprises using at least one of the master template regions as a master template to imprint at least one blazed diffraction grating pattern on a grating substrate.

In another aspect, a method of fabricating a master template for imprinting a blazed diffraction grating comprises providing a master template substrate and providing a primary master template comprising periodically repeating lines formed on a primary master substrate. The method additionally comprises imprinting periodically repeating lines on the master template substrate using the primary master template in a plurality of master template regions. The periodically repeating lines in different ones of the master template regions extend in different directions.

In another aspect, a method of fabricating a diffraction grating comprises providing a master template substrate. The method additionally comprises imprinting periodically repeating lines on the master template substrate in one or more master template regions, wherein the periodically repeating lines are formed of a first material. The method additionally comprises coating the periodically repeating lines with a second material having a greater hardness than the first material. The method further comprises using one or more master template regions as a master template to imprint one or more blazed diffraction grating pattern on a grating substrate.

BRIEF DESCRIPTION OF THE DRAWINGS

FIG. 11A schematically illustrates a top down view of an example device master template having formed thereon multiple device template regions each having diffraction grating lines extending in the same direction.

FIG. 11B schematically illustrates a top down view of an example device master template having formed thereon multiple device template regions having diffraction grating lines extending in different directions.

FIGS. 12A-12C schematically illustrate cross-sectional views of intermediate structures at various stages of forming a primary master template having grooves with symmetric facets for fabricating a device master template.

FIGS. 14A-14C schematically illustrate cross-sectional views of intermediate structures at various stages of fabricating a primary master template having a reduced flat surface between adjacent grooves.

FIGS. 15A-15C schematically illustrate cross-sectional views of intermediate structures at various stages of fabricating a primary master template having a reduced flat surface between adjacent grooves.

FIGS. 16A-16E schematically illustrate top down and cross-sectional views of intermediate structures at various stages of forming a device master template by imprinting a pattern on a device template substrate and etching the device template substrate using the imprinted pattern as a partial mask.

FIG. 16F is a scanning electron microscope image of a blazed diffraction grating pattern of a device master template resulting from a fabrication process flow illustrated in FIGS. 16A-16E.

FIGS. 18A-18B schematically illustrate cross-sectional views of intermediate structures at different stages of forming a device master template by imprinting a pattern on a device template substrate and etching the device template substrate using the imprinted pattern as a partial mask.

FIGS. 21A-21B schematically illustrate top down and cross-sectional views of intermediate structures at various stages of forming a device master template by imprinting a pattern on a device template substrate and coating the pattern, and forming a blazed diffraction grating on a device substrate by imprinting using the device master template.

FIGS. 22A-22D schematically illustrate top down and cross-sectional views of intermediate structures at various stages of forming a device master template by imprinting a pattern on a device template substrate and coating the pattern, and forming a blazed diffraction grating on a device substrate by imprinting using the device master template.

Figure 1:
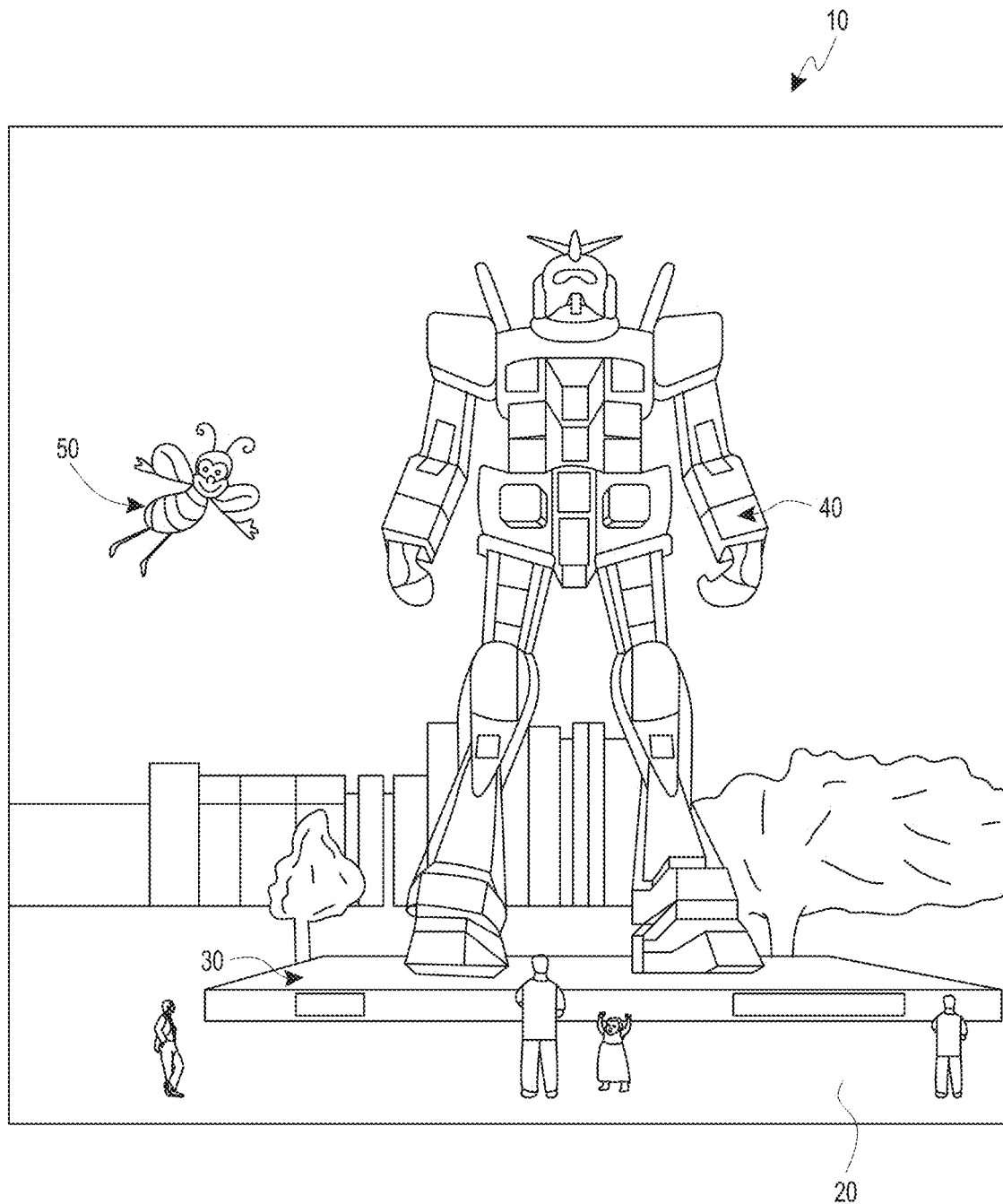
FIG. 1 illustrates a user's view of augmented reality (AR) through an AR device.

Throughout the drawings, reference numbers may be re-used to indicate correspondence between referenced elements. The drawings are provided to illustrate example embodiments described herein and are not intended to limit the scope of the disclosure.

DETAILED DESCRIPTION

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

Various AR systems disclosed herein include a virtual/augmented/mixed display, which in turn can includes one or more optical elements formed on or as part of a waveguide. The optical elements may include, e.g., an in-coupling optical element that may be employed to couple light into a waveguide, and/or an out-coupling optical element that may be employed to couple light out of the waveguide and into the user's eyes. To achieve high efficiency in in-coupling of light into and/or out-coupling of light from the waveguide, optical elements may include diffraction gratings. In some display systems, a relatively high diffraction efficiency of the optical elements may be achieved in part by including a blazed diffraction grating, which is a type of diffraction grating that is optimized to achieve enhanced diffraction efficiency for a given diffraction order, such that the optical power is enhanced or maximized for the given diffraction order. The enhanced diffraction efficiency for a given diffraction order is in turn achieved in some blazed diffraction gratings by having faceted features, e.g., faceted lines. A blazed diffraction grating having the faceted features such as lines can be fabricated by imprinting a blazed diffraction grating pattern on a device substrate, e.g., a waveguide, using a device master template. As a result, the manufacturing throughput may be limited by number of blazed diffraction grating patterns the device master template can imprint on the device substrate simultaneously. Advantageously, in the manufacturing technology described herein, the device master templates are configured to imprint a relatively high number of blazed diffraction grating patterns on the device substrate simultaneously, thereby allowing for relatively high manufacturing throughput of blazed diffraction gratings. In particular, in the disclosed technology, a device master template having blazed diffraction patterns that extend in multiple directions, e.g., in a radial directions, is manufactured, which allows for efficient usage of the area of the device master template for high throughput parallel imprinting of blazed diffraction patterns on device substrates such as waveguides.

Reference will now be made to the drawings, in which like reference numerals refer to like parts throughout. Unless indicated otherwise, the drawings are schematic not necessarily drawn to scale.

Figure 2:
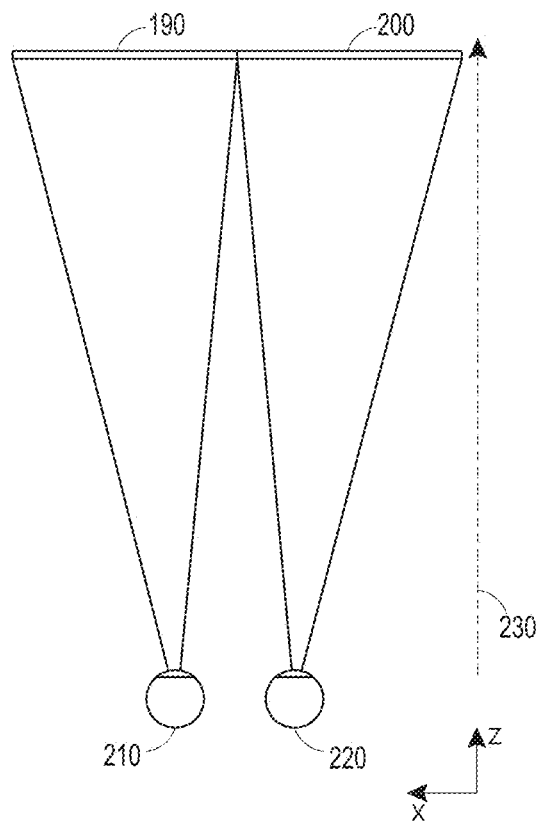
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
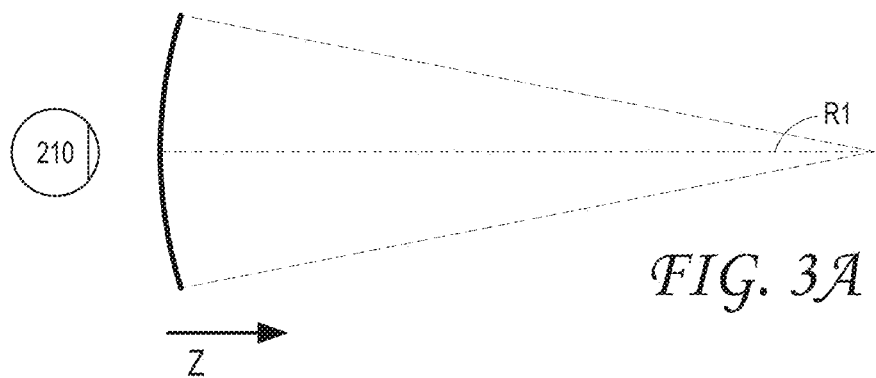
FIGS. 3A-3C illustrate relationships between radius of curvature and focal radius.
Figure 3B:
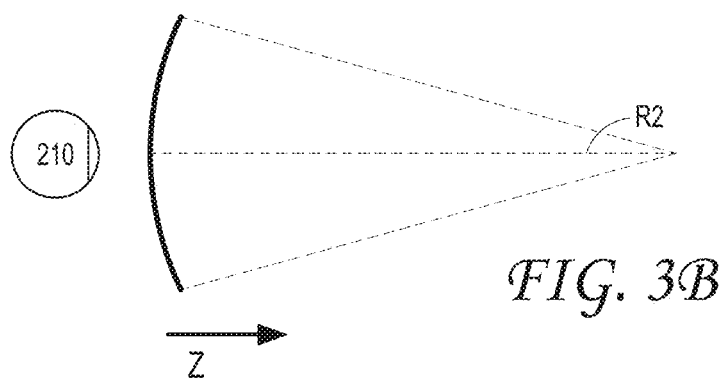
Figure 3C:
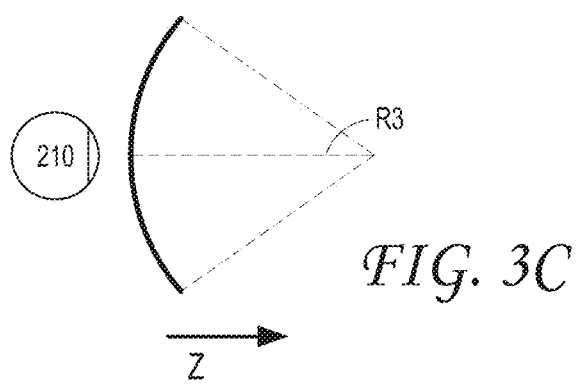

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
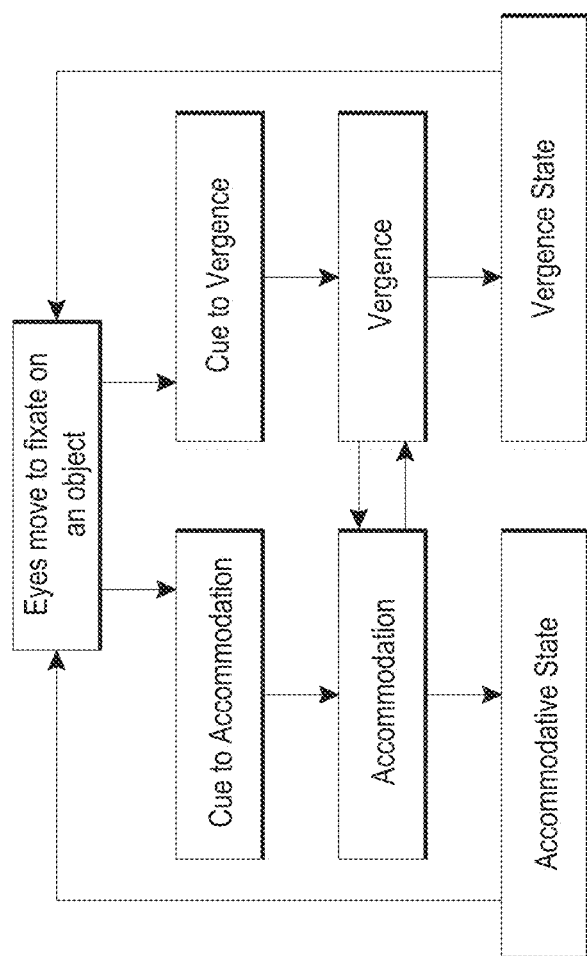
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
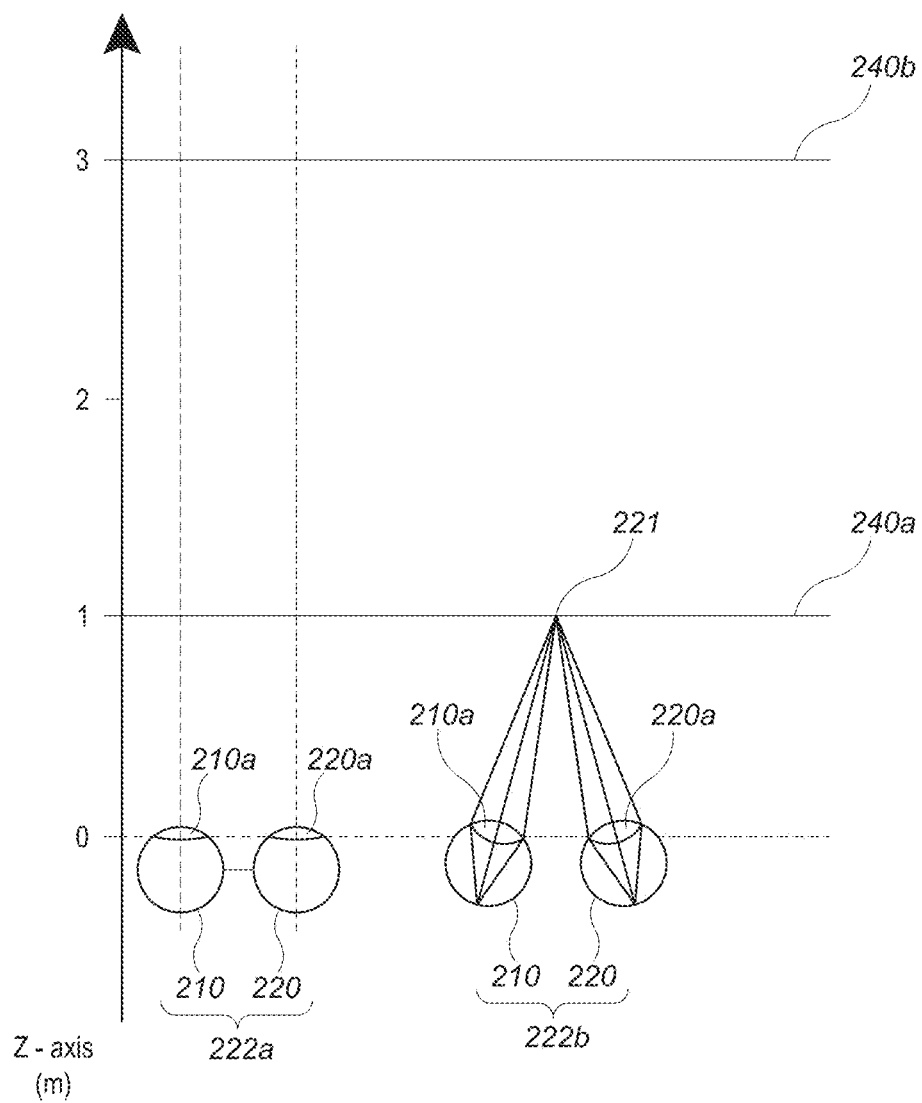
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
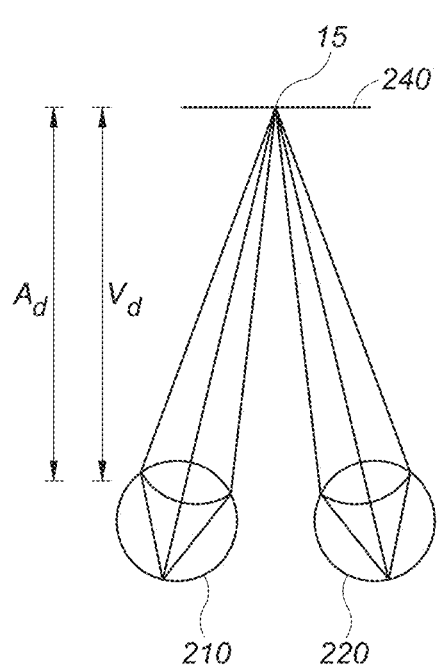
FIG. 4C illustrates an example of a representation of a top-down view of a user viewing content via a display system.
Figure 4D:
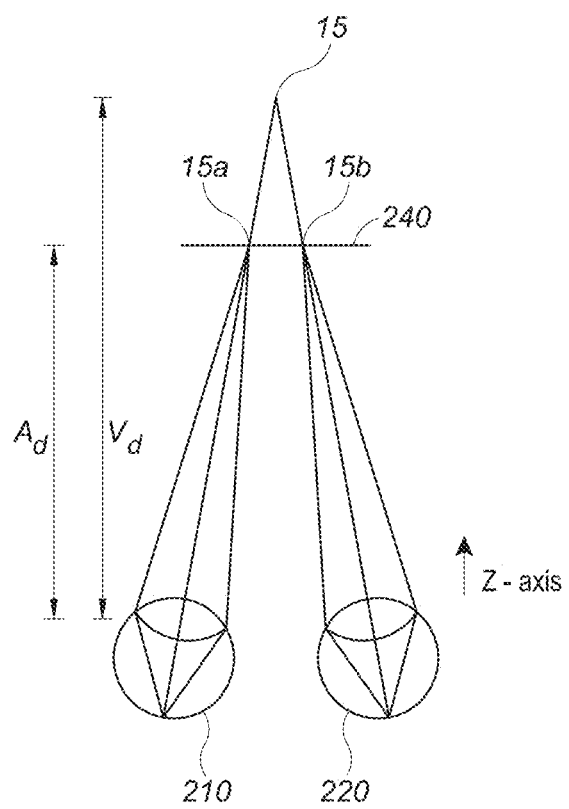
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d-A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
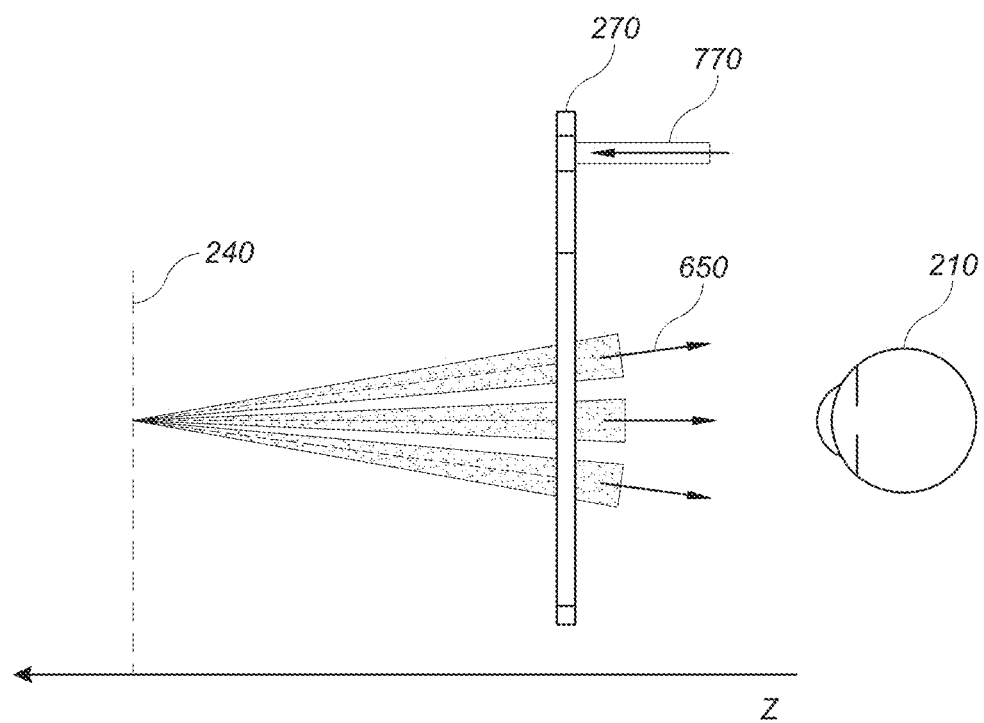
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
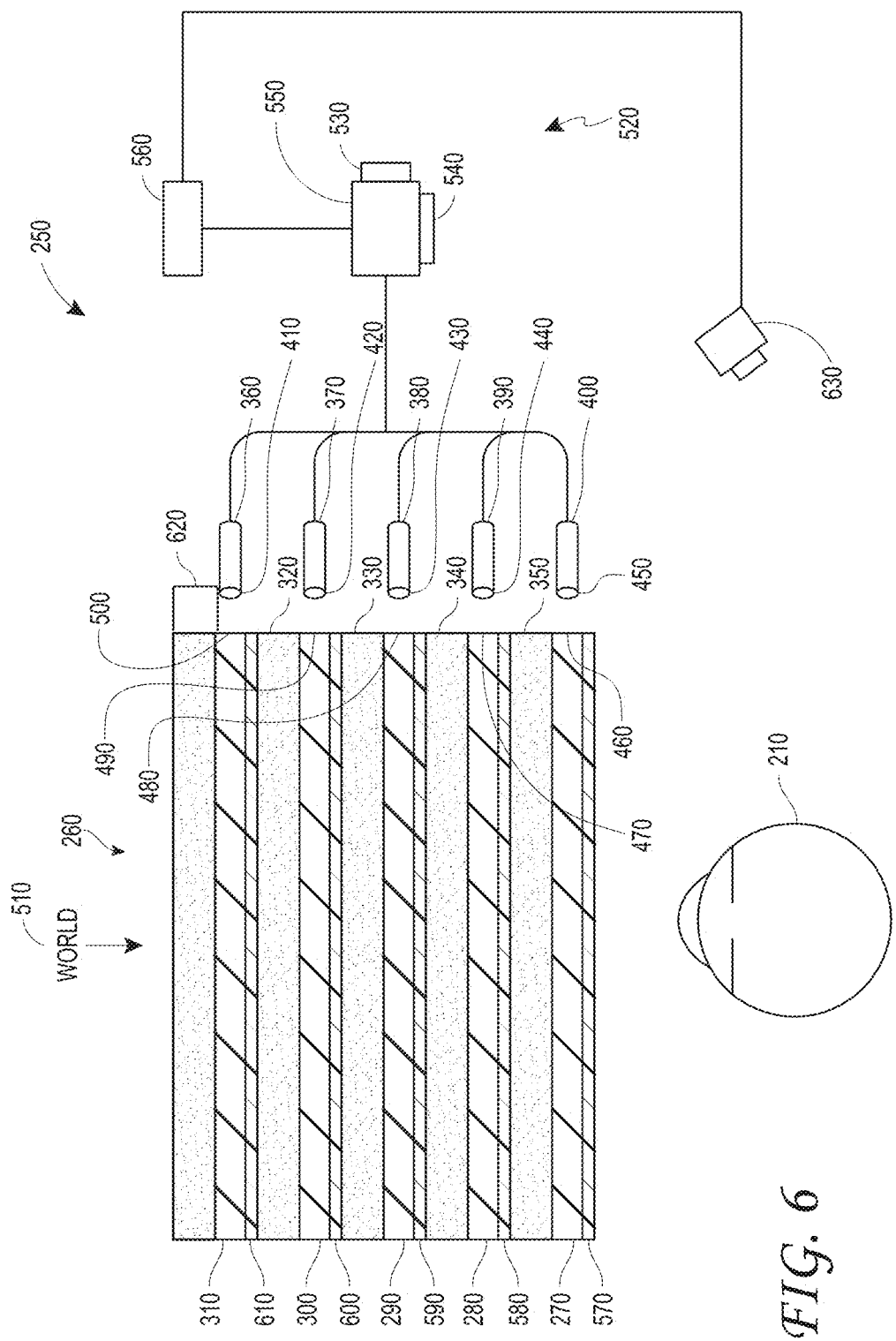
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
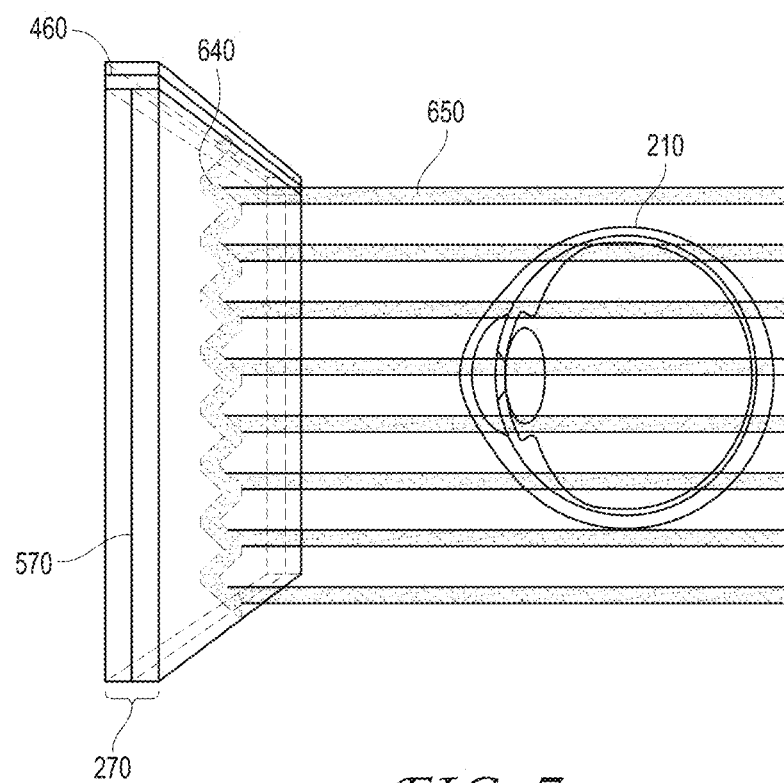
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
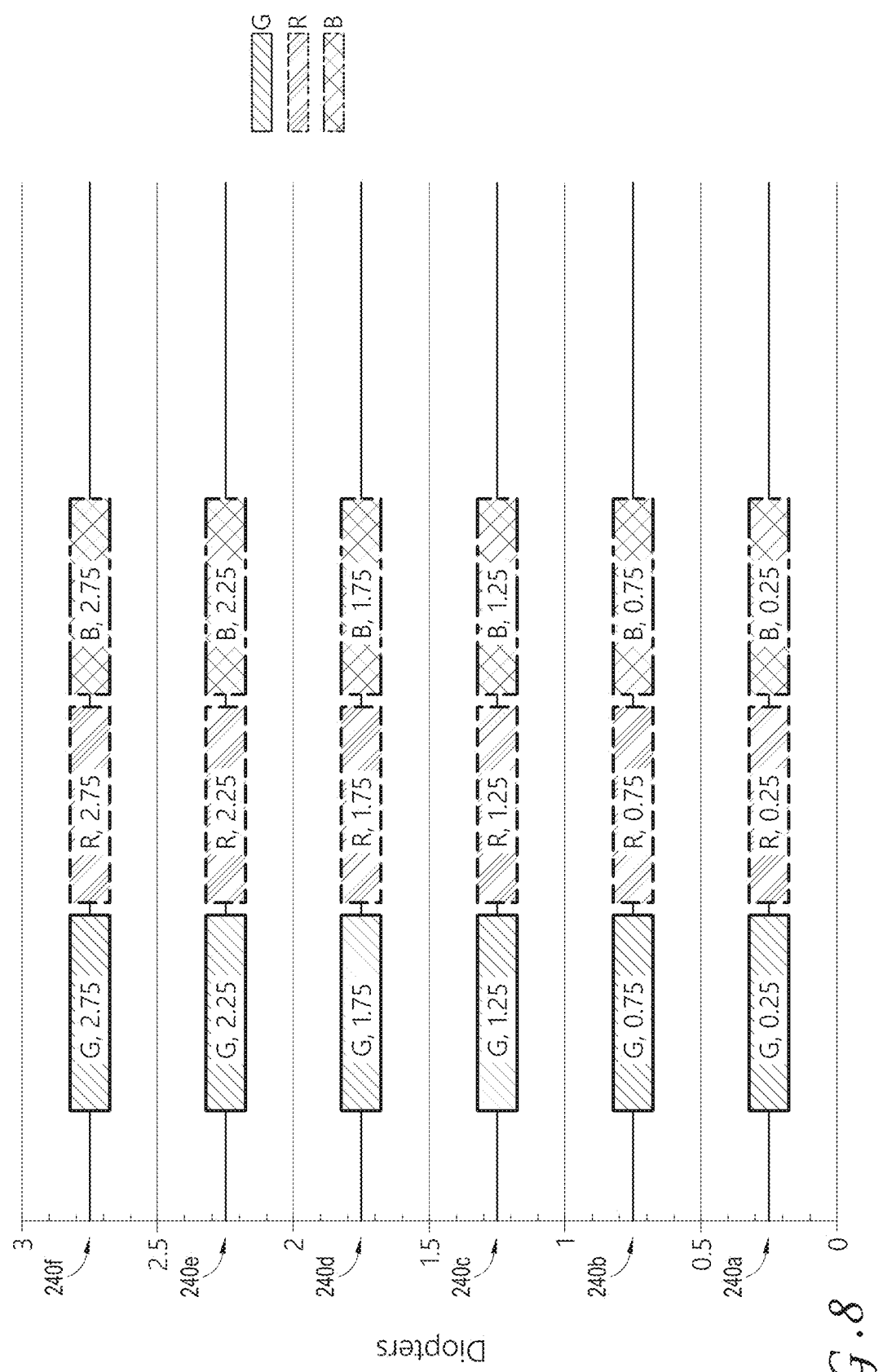
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
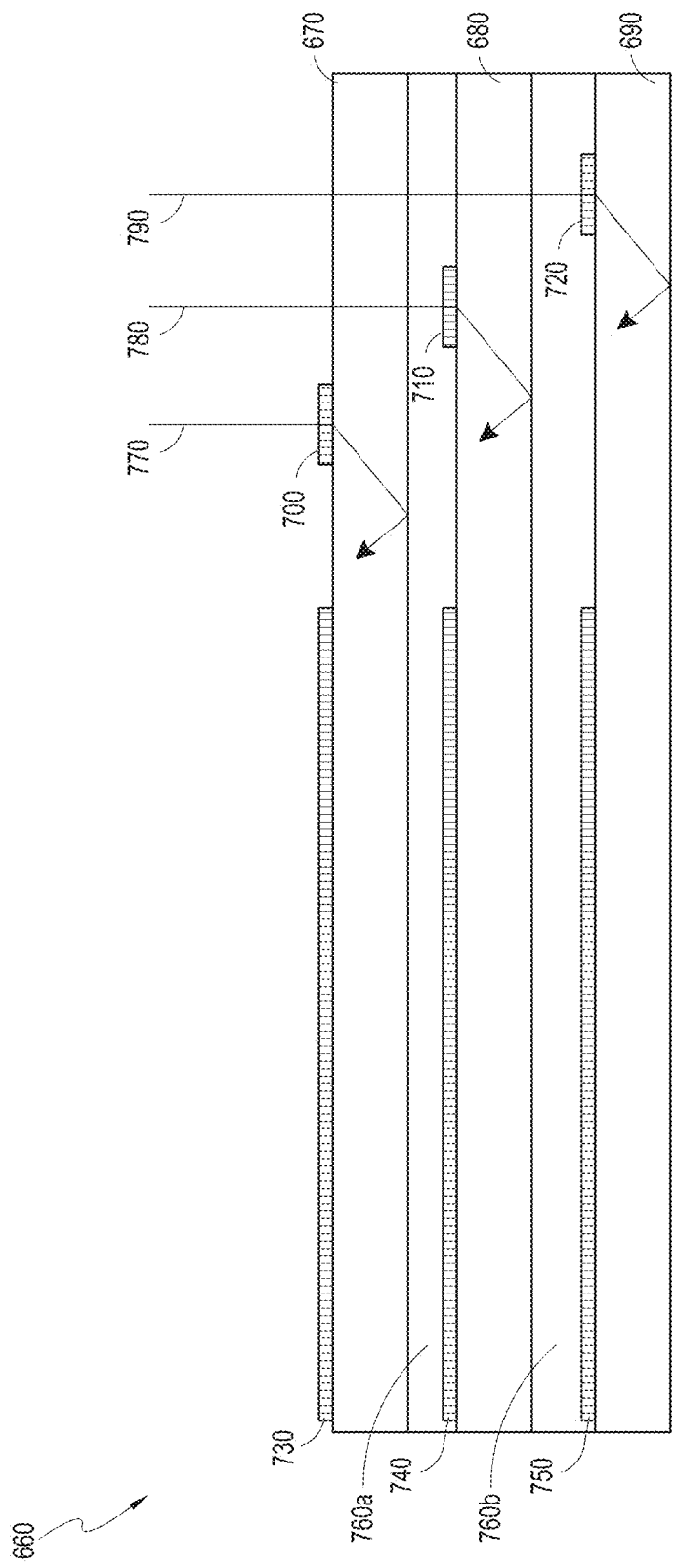
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
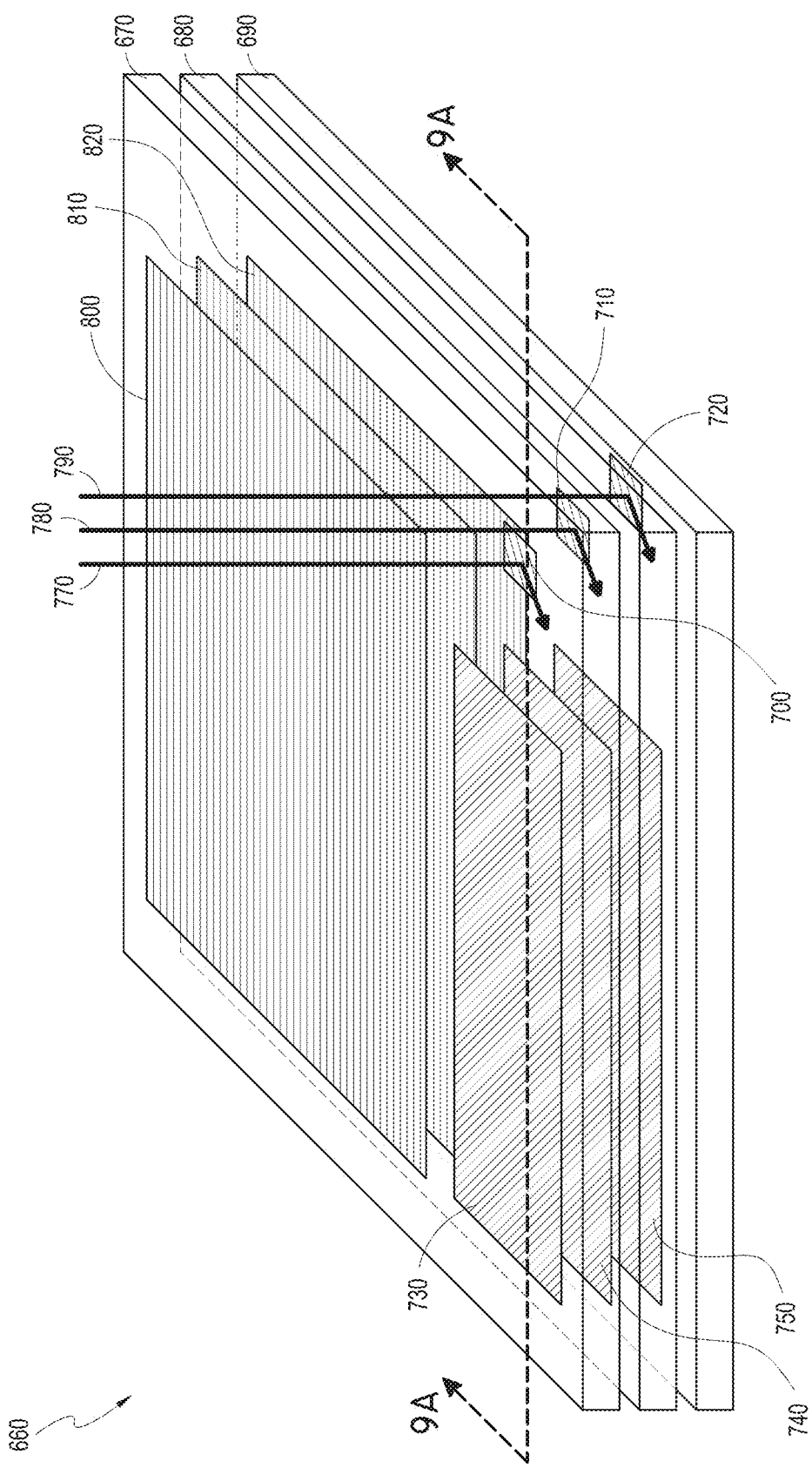
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
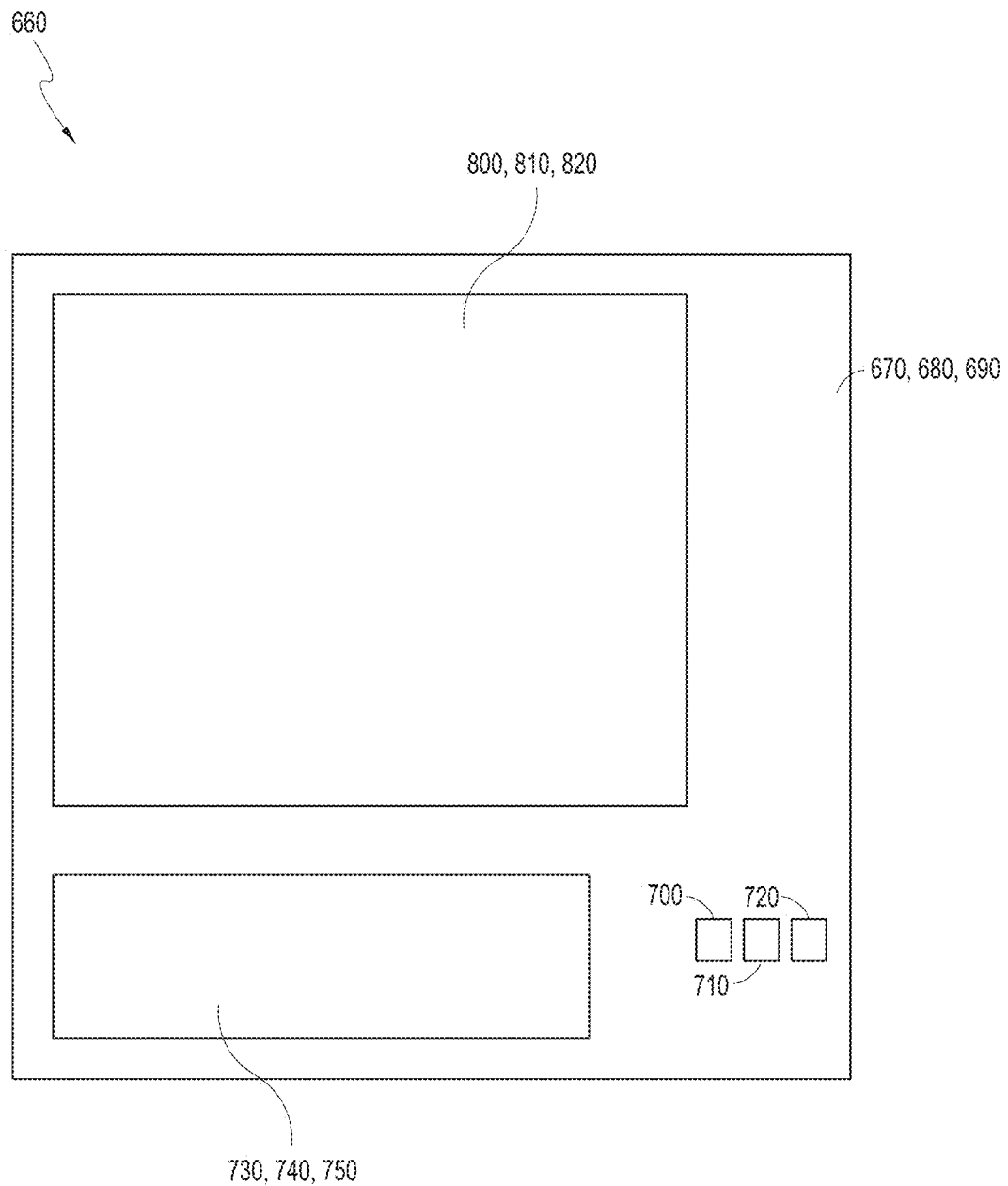
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
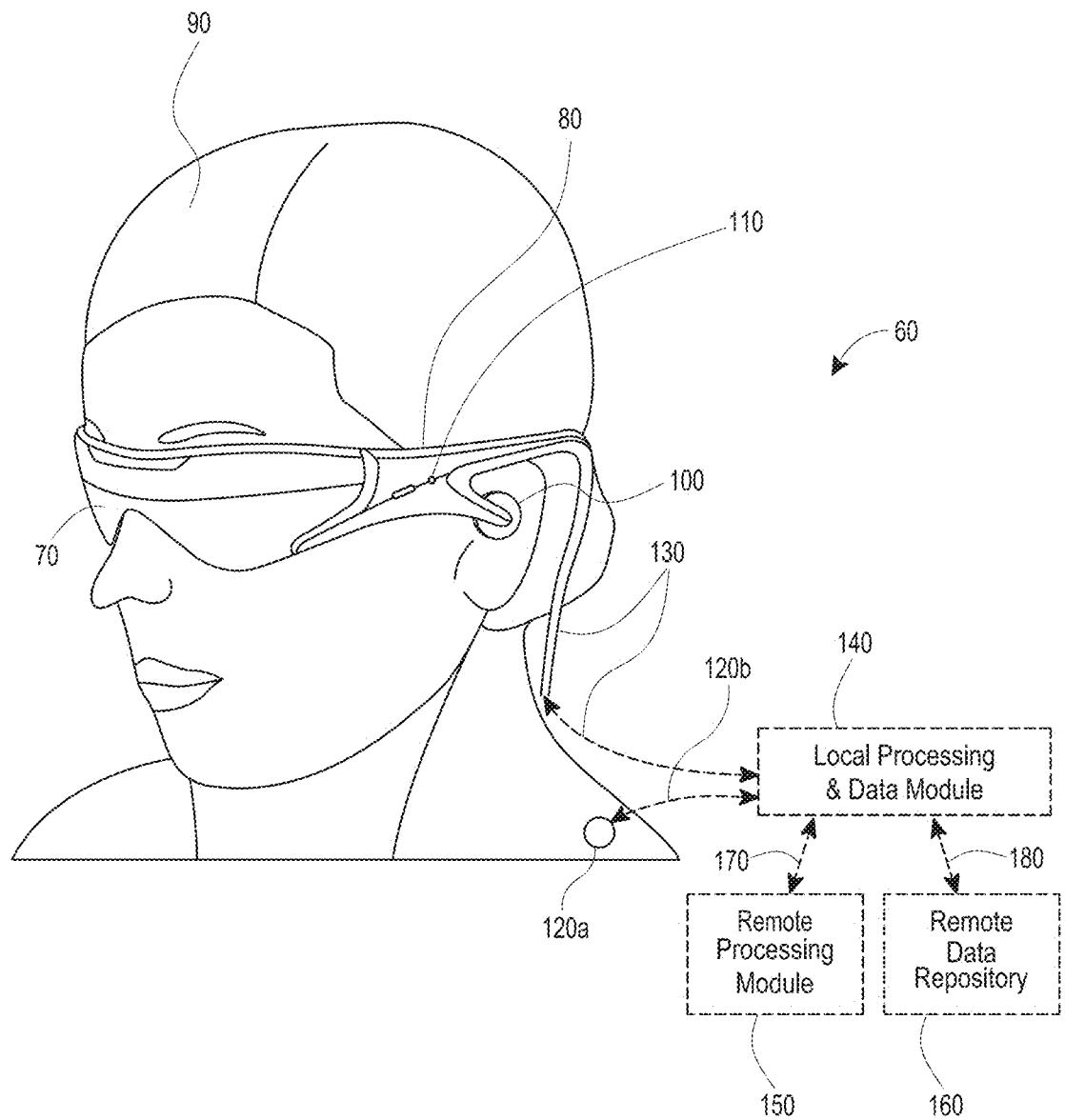
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Waveguides Integrated with Optical Elements Comprising Blazed Gratings

Providing an immersive experience to a user of waveguide-based display systems, e.g., various semitransparent or transparent display systems configured for virtual/augmented/mixed reality display applications described supra, depends on, among other things, various characteristics of the light coupling into and out of the waveguides of the display systems. For example, a virtual/augmented/mixed reality display having high light incoupling and outcoupling efficiencies for one or more polarizations of light can enhance the viewing experience by providing relatively high brightness and/or clarity.

As described supra, e.g., in reference to FIGS. 6 and 7, display systems according to various embodiments described herein may include optical elements, e.g., in-coupling optical elements, out-coupling optical elements, and/or light distributing elements, which may in turn comprise diffraction gratings or diffractive optical elements (DOEs). The in-coupling optical elements such as in-coupling diffraction gratings (ICGs) may be employed to couple light into the waveguides, and out-coupling optical elements such as exit pupil expanders (EPEs) may be employed to couple light out of the waveguides into the user's eyes. For example, as described above in reference to FIGS. 6 and 7, light 640 that is injected into the waveguide 270 at the input surface 460 of the waveguide 270 propagates within the waveguide 270 by total internal reflection (TIR). At points where the light 640 impinges on the out-coupling optical element 570, a portion of the light exits the waveguide as beamlets 650. In some implementations, any of the optical elements 570, 580, 590, 600, 610 can include or be configured as a diffraction grating or DOE.

To achieve desirable characteristics of in-coupling of light into (or out-coupling of light from) the waveguides 270, 280, 290, 300, 310, the optical elements 570, 580, 590, 600, 610 configured as diffraction gratings or DOEs can be formed of a suitable material and have a suitable structure for controlling various optical properties, including diffraction properties. The desirable diffraction properties include, among other properties, spectral selectivity, angular selectivity, polarization selectivity, high spectral bandwidth, a wide field of view and high diffraction efficiencies.

To achieve one or more of these and other advantages including relatively high diffraction efficiencies of the optical elements, various example optical elements described herein include a blazed diffraction grating. A blazed diffraction grating refers to a type of diffraction grating that is configured (e.g., optimized) to achieve enhanced diffraction efficiency for a given diffraction order (e.g., the first order), such that the optical power is enhanced or maximized for the given diffraction order while the residual power in the other orders (e.g., the zeroth order) is reduced or minimized. For example, a blazed diffraction grating pattern has a geometry configured to have a first order diffraction efficiency greater than 30%, 40%, 50%, 60% or 70% for at least one polarization of light. Such configuring of the grating or optimization occurs for a particular wavelength, referred to as a blaze wavelength, for which the blazed diffraction grating is designed, configured, and/or optimized.

The enhanced diffraction efficiency for a given diffraction order is achieved in some blazed diffraction gratings by having faceted features, e.g., faceted lines. A blazed diffraction grating having faceted lines can be fabricated by imprinting a blazed diffraction grating pattern on a device substrate, e.g., a waveguide, using a device master template as an imprint mold. In such fabrication processes, the manufacturing throughput may be limited by the number of blazed diffraction grating patterns the device master template can imprint on a given device substrate. Advantageously, in the manufacturing technology described herein, the device master templates are configured to imprint a relatively large number of blazed diffraction grating patterns on the device substrate, thereby allowing for relatively high manufacturing throughput of the blazed diffraction gratings. In particular, in the disclosed technology, a device master template having blazed diffraction grating patterns that extend in multiple directions, e.g., in a radial directions, is manufactured, which allows for efficient usage of the area of the device master template for high throughput parallel, e.g., simultaneous, imprinting of blazed diffraction grating patterns on device substrates such as waveguides.

Figure 10A:
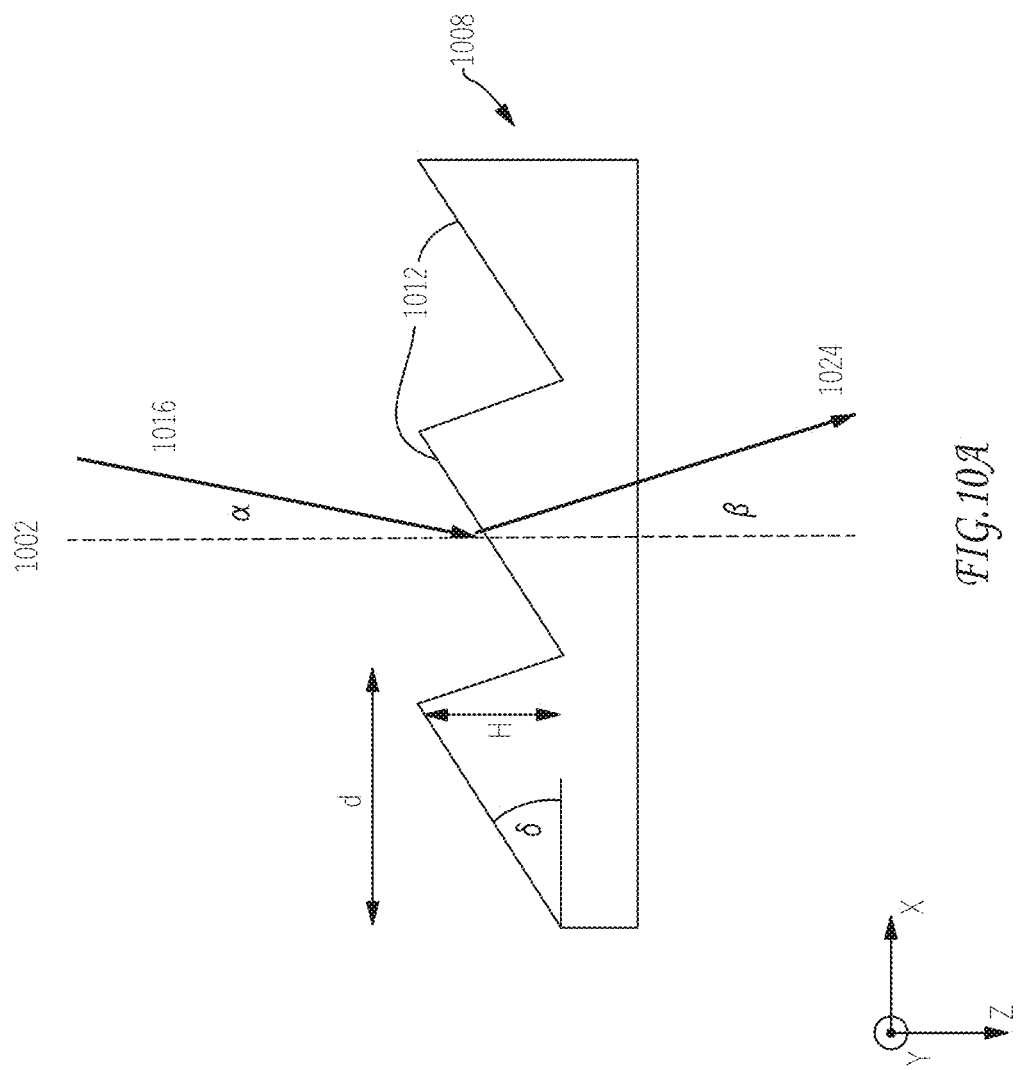
FIG. 10A schematically illustrates a cross-sectional view of an example blazed transmission diffraction grating.

FIG. 10A illustrates a cross-sectional view of an example blazed transmission diffraction grating 1008 that can be included as part of an optical element, such as an in-coupling optical element and/or an out-coupling optical element or both. The blazed diffraction grating 1008 has a constant pitch d. In operation, an incident light beam 1016 incident at an angle $\alpha$ with respect to the normal direction 1002 (e.g., the z-direction) is diffracted as a diffracted light beam 1024 at a relatively high or maximum efficiency at a blaze angle $\beta$ with respect to the normal direction 1002. A blazed diffraction grating such as the illustrated blazed transmission diffraction grating 1008 can be characterized by the blaze angle $\beta$, a blaze wavelength and the diffraction order for which the blazed diffraction grating is designed or optimized for. Although a transmissive diffraction 1008 grating is shown, in other configurations, the diffraction grating could serve as a reflective diffractive grating that diffracts light reflected therefrom, for example, to couple light into the waveguide to be guided therein by total internal reflection or couple light out of the waveguide and/or perform other functions.

Blazed diffraction gratings such as the illustrated blazed transmission diffraction grating 1008 can comprise grating features (e.g., lines) that have a saw tooth shape having, e.g., a triangular cross-sectional shape. For example, in the illustrated example, the cross-sectional shape has a triangular saw tooth-shape that forms a tilted step structure. The steps can be tilted at a facet angle $\delta$, which is also referred to as a blazed angle, with respect to a horizontal plane, e.g., the x-y plane that is normal to the grating normal direction 1002, e.g., the z-direction.

In some implementations, the blazed transmission diffraction grating 1008 can have a particular arrangement known as Littrow configuration, which is a geometry in which the diffraction angle $\beta$, the incidence angle $\alpha$ and the facet angle $\delta$ are identical. Hence, in a Littrow configuration, $\alpha=\beta=\delta$.

The blaze angle $\delta$ can be designed or optimized to enhance or maximize efficiency of light having a particular wavelength. As described above, the blazed transmission diffraction gratings according to embodiments are configured to diffract visible light incident thereon into respective waveguides, such that visible light diffracted into the waveguides is guided within each of the waveguides, for example, by total internal reflection (TIR). In some implementations, the diffraction gratings can be configured to diffract the visible light into the respective waveguides when the visible light is incident thereon within respective ranges of angles, or field of views (FOVs). In some other implementations, the diffraction gratings can also be configured to diffract visible light out of the respective waveguides into respective ranges of angles or field of views. In some other implementations, the diffraction gratings can be configured as a light distributing element configured to distribute and propagate light within the waveguide towards an outcoupling element. In yet some other implementations, the diffraction gratings can serve as a combined outcoupling grating and light distributing element configured to distribute and propagate light within the waveguide and further configured to outcouple the light from the waveguide.

In the illustrated example in FIG. 10A, the diffraction grating 1008 comprises a plurality of blazed diffraction grating lines 1012 that are elongated in a first horizontal direction or the y-direction and periodically repeat in a second horizontal direction or the x-direction. The diffraction grating lines 1012 can be, e.g., straight and continuous lines extending in the y-direction. However, embodiments are not so limited.

In some implementations, the diffraction grating lines 1012 can be discontinuous lines, e.g., in the y direction. In some other implementations, the discontinuous lines can form a plurality of pillars protruding from a surface of the grating substrate. In some implementations, at least some of the diffraction grating lines 1012 can have different widths in the x-direction.

In the illustrated example, the diffraction grating lines 1012 have a profile, e.g., a sawtooth profile, having asymmetric opposing side surfaces forming different angles with respect to a plane of the substrate. However, embodiments are not so limited and in other implementations, the diffraction grating lines 1012 can have symmetric opposing side surfaces forming similar angles with respect to a plane of the substrate.

In the illustrated example, the diffraction grating lines 1012 are arranged as a one-dimensional (1D) array having a periodicity in one lateral direction, e.g., the x-direction. In these configuration, the 1D array can serve as a 1D grating configured to diffract light preferentially in one direction. However, embodiments are not so limited, and in other configurations, the diffractive grating lines 1012, e.g., discontinuous lines or protrusions, can be arranged as a two-dimensional (2D) array having periodicities in two lateral directions. In these configurations, the 2D array serves as a 2D grating configured to diffract light preferentially in two directions. In a particular implementation, the 2D array can have the same number of diffractive features in two different lateral directions to form, e.g., a square array.

Figure 10B:
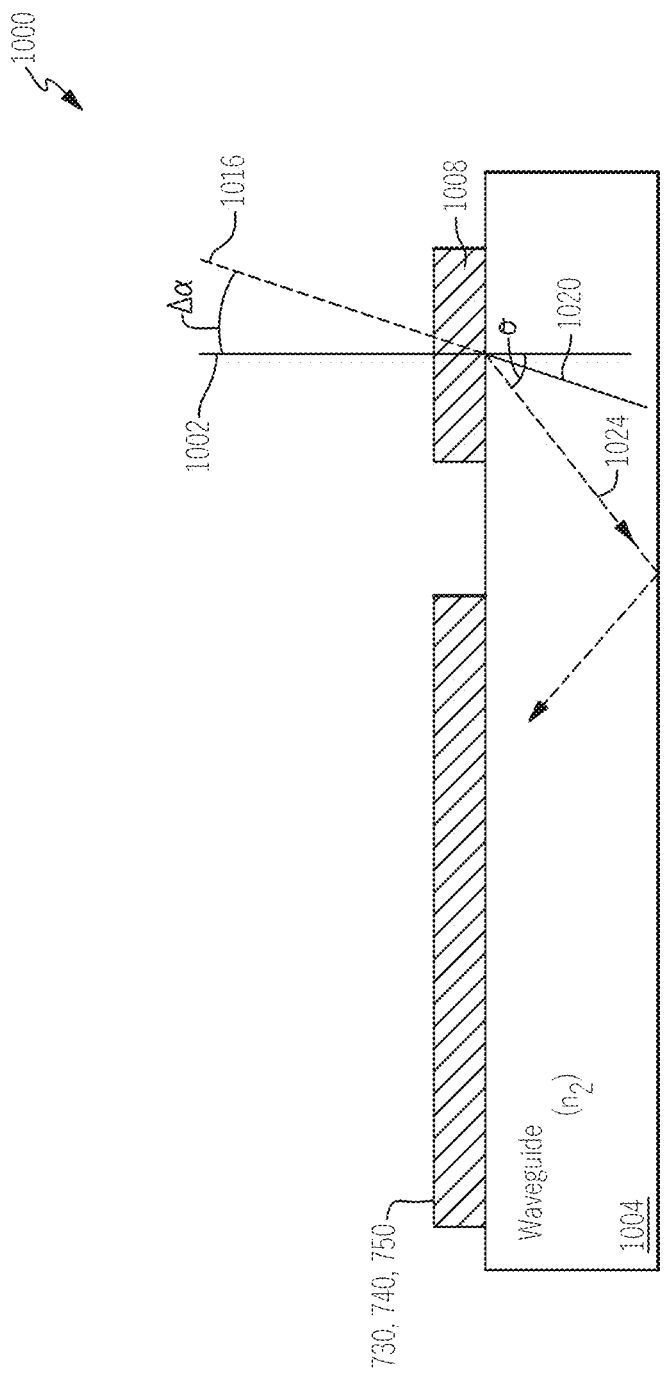
FIG. 10B schematically illustrates a cross-sectional view of a portion of a waveguide having disposed thereon a transmission diffraction grating configured as an in-coupling optical element.

FIG. 10B illustrates a cross-sectional view of a portion of a display device 1000 comprising a waveguide 1004 and a blazed transmission diffraction grating 1008 formed on the waveguide 1004, according to some embodiments. The blazed transmission diffraction grating 1008 is configured to diffract light having a wavelength in the visible spectrum such that the light is guided within the waveguide 1004 by TIR. The waveguide 1004 can correspond to one of waveguides 670, 680, 690 described above with respect to FIGS. 9A-9C, for example. As described above, the blazed transmission diffraction grating 1008 can correspond to, e.g., an in-coupling optical element (700, 710, 720, FIGS. 9A-9C), also referred to herein as an in-coupling grating (ICG). The display device 1000 can additionally include various other optical elements as part of a display device described above, including out-coupling optical elements. For example, in the illustrated embodiment, the display device 1000 additionally includes light distributing elements 730, 740, 750 similar to those described above with respect to FIGS. 9A-9C. The display device 1000 can include other elements including out-coupling optical elements (800, 810, 820, FIGS. 9A-9C), for example.

In operation, when an incident light beam 1016, e.g., visible light, is incident on the blazed diffraction grating 1008 at an angle of incidence α measured relative to a plane normal 1002 that is normal or orthogonal to the surface 1008S extending in the y-x plane, the blazed diffraction grating 1008 at least partially diffracts the incident light beam 1016 as a diffracted light beam 1024 at a diffraction angle θ measured relative to the plane normal 1002, while at least partially transmitting the incident light as a transmitted light beam 1020. When the diffracted light beam 1024 is diffracted at a diffraction angle θ that exceeds a critical angle $\theta_{TIR}$ for occurrence of total internal reflection in the waveguide 1004, the diffracted light beam 1024 is guided within the waveguide 1004 along the x-axis via total internal reflection (TIR) until the diffracted light beam 1024 reaches one of light distributing elements 730, 740, 750, for example, or one of the out-coupling optical elements (800, 810, 820, FIGS. 9A-9C), for example.

Fabrication of Blazed Grating Structures Using Master Templates

In some manufacturing techniques, blazed diffraction gratings are manufactured by imprinting a blazed diffraction grating pattern directly on a substrate, e.g., a device substrate such as a waveguide. In some other manufacturing techniques, blazed diffraction gratings are manufactured by imprinting a patterning layer, which is in turn used to pattern a blazed diffraction grating pattern into a substrate. In these techniques, the imprinting process can utilize a master template. The master template can have a blazed diffraction grating structure similar to and corresponding to the final blazed diffraction grating pattern, such as the pattern of the blazed transmission diffraction grating 1008 illustrated in FIG. 10A. Thus, in various embodiments, a blazed diffraction grating pattern can serve as a master template for fabricating a final blazed diffraction grating. For example, a blazed diffraction grating structure such as the blazed diffraction grating 1008 illustrated in FIG. 10A can serve as a master template for imprinting a photoresist pattern that may be used as a blazed diffraction grating pattern or a patterning layer used as a partial mask to etch a blazed diffraction grating pattern into a substrate underneath.

In yet other manufacturing techniques, a blazed diffraction grating structure can also serve as a master template for fabricating another master template. For example, a blazed diffraction grating structure such as the blazed transmission diffraction grating 1008 illustrated in FIG. 10A can serve as a master template for imprinting a photoresist pattern comprising a blazed diffraction grating pattern or a patterning layer for patterning a blazed diffraction grating pattern into a substrate underneath, where the resulting substrate having the blazed diffraction grating pattern formed thereon can in turn be used as a master template for forming another master template for fabricating a final blazed diffraction grating.

As described herein, a first master template used for imprinting structures used to fabricate another master template is referred to as a primary master template. As described herein, the last master template used for imprinting structures on a device substrate, e.g., a waveguide, is referred to as a device master template. There may be additional master templates involved in forming a blazed diffraction grating on a device substrate. When more than two master templates including a primary master template and a device master template are used to fabricate a final imprinted structure of a device, the intervening master templates may be referred to herein as intermediate master templates, e.g., an nth intermediate master template, where n=1, 2, etc.

Various process flows for fabricating display devices having integrated thereon optical elements such as blazed diffraction gratings may utilize manufacturing platforms, substrates and tools that are used in or similar to those used in semiconductor or display device fabrication. For example, some master templates for imprinting blazed diffraction grating structures may be formed on semiconductor substrates such as silicon wafers. Semiconductor wafers such as silicon wafers can be advantageous for forming a master template, e.g., a primary master template, comprising a blazed diffraction grating structure such as the saw tooth blazed diffraction grating structure described above with respect to FIG. 10A because single crystal substrates such as silicon wafers have naturally occurring crystallographic planes that are conducive to forming facets arranged at particular angles as illustrated in the blazed transmission diffraction grating 1008 of FIG. 10A. For example, as described in detail infra, silicon wafers contain different crystallographic planes that have different wet etching rates when exposed to certain chemicals. The different etching rates of different crystal planes of silicon can be advantageously used to form blazed diffraction grating patterns having facets such as those illustrated with respect to the blazed transmission diffraction grating 1008 illustrated in FIG. 10A. For example, wet etching silicon wafers in certain chemicals such as potassium hydroxide (KOH) can naturally form trenches, grooves or lines having preferential crystalline facets, and these trenches, grooves or lines can be adapted as blazed diffraction grating patterns for a master template, e.g., a primary master template, for fabricating a blazed diffraction grating.

Because substrates such as silicon wafers are circular in shape, and because silicon crystal has cubic crystal symmetry, when blazed diffraction grating patterns are formed in silicon using preferential crystalline facets as described above, the thus formed faceted lines of the blazed diffraction grating patterns can extend in predefined directions, e.g., directions predefined by certain crystallographic directions. These directions may have particular angular relationships therebetween, e.g., parallel or orthogonal or horizontal or vertical directions due to the cubic symmetry and diamond cubic crystal structure of crystalline silicon. Forming multiple identical master templates each having blazed diffraction grating patterns extending in these predefined directions, however, can result in a relatively inefficient usage of the overall footprint of the silicon wafer. This is illustrated in reference to FIG. 11A. FIG. 11A illustrates top down view of an example master template 1100A, which may include a master template substrate 1100, such as a {100} oriented silicon wafer, having formed thereon a plurality of device template regions 1104. Each of the device template regions 1104 includes a blazed diffraction grating pattern region 1108. Each of the blazed diffraction grating pattern regions 1108 in turn includes blazed diffraction grating lines extending in the same predefined direction, e.g., the x-direction or the y-direction, which may be a preferential direction of facet elongation in silicon crystals. When the lines of the blazed diffraction grating pattern regions 1108 are restricted to extend in the same directions for different blazed diffraction grating pattern regions 1108 as illustrated, the usage of the substrate footprint in defining device template regions 1104 may not be as efficient as in arrangements where the lines of the blazed diffraction grating pattern regions 1108 are allowed to extend in different directions that are not limited to crystallographic directions, e.g., approximately radial directions. An example arrangement in which the device template regions 1104 have blazed diffraction grating lines of the blazed diffraction grating pattern regions 1108 that extend in different directions is illustrated in a top down view of an example master template 1100B in FIG. 11B, according to embodiments. Similar to the master template 1100A, the illustrated master template 1100B includes a master template substrate 1100, having formed thereon a plurality of device template regions 1104. Each of the device template regions 1104 includes a blazed diffraction grating pattern region 1108. However, unlike the device template regions 1104 of the master template 1100A illustrated in FIG. 11A in which lines of different blazed diffraction grating pattern regions 1108 extend in the same direction, the blazed diffraction grating regions 1108 of different device template regions 1104 extend in different directions that are not limited to crystallographic directions. In particular, the device template regions 1104 and the blazed diffraction grating pattern regions 1108 are defined in a radial (possibly even symmetric) manner with respect to the central axis of the master template substrate 1100, such that the lines of different ones of the blazed diffraction grating pattern regions 1108 can be parallel to each other within the blazed diffraction pattern regions 1108 but extend in different radial directions with respect to others of the blazed diffraction grating pattern regions 1108 on the same master template substrate 1100. When the sets of lines of the blazed diffraction grating pattern regions 1008 are allowed to extend in different directions that are not limited to crystallographic directions of crystalline silicon, e.g., as in the illustrated "pinwheel" arrangement in FIG. 11B, the substrate area can be utilized to define device template regions 1104 in a much more efficient manner compared to the arrangement illustrated in FIG. 11A in which the sets of lines of different ones of the blazed diffraction grating pattern regions 1108 extend in the same direction. For illustrative purpose only, when the master template substrate 1100 is a 150 mm diameter silicon wafer, and when the device template regions 1104 have dimensions of 40 mm×50 mm, the arrangement of the master template 1100A illustrated in FIG. 11A may be able to fit only up to four device template regions 1104, whereas the pinwheel arrangement of the master template 1100B illustrated in FIG. 11B can fit up to six device template regions 1104, thereby increasing the manufacturing throughput by 50%. Thus, in recognition of this and other advantages, the inventors have discovered the following manufacturing techniques in which the lines of different blazed diffraction grating pattern regions 1108 extend in different directions, as described herein.

Fabrication of Primary Master Templates for Imprinting Blazed Patterns on Master Template Substrates Monocrystalline substrates such as e.g., monocrystalline silicon (Si) wafers and monocrystalline germanium (Ge) wafers possess certain crystallographic attributes that can advantageously be used for fabricating a primary master template for imprinting blazed diffraction grating patterns on master template substrates. The monocrystalline substrates have a major substrate surface having a certain crystallographic orientation. Single-crystal Si and Ge have a diamond cubic lattice structure, which are two interpenetrating face-centered cubic lattices structures separated by ¼ of a lattice constant along each axis of the unit cell. The crystallographic planes or facets of the single crystals of Si and Ge can be denoted as (hkl) for individual planes or facets, or as {hkl} for families of planes or facets, where h, k and l are known as Miller indices. Any two planes of the crystallographic planes or faces of single-crystal Si and Ge can be defined by an angle (θ) therebetween. Different crystallographic planes of single crystal Si and Ge wafers have different surface densities of atoms and bond angles therebetween. As a result, different crystallographic planes have different physical properties, such as etch removal rates in certain etchants. The different etch rates and the angular relationships between different crystallographic planes in single crystal substrates such as Si and Ge wafers can be utilized according to various embodiments to fabricate a primary master template having desired line shapes for imprinting blazed diffraction grating patterns on master template substrates, as described below.

Some monocrystalline substrates such as Si and Ge wafers can be anisotropically etched in certain etchants, such as aqueous KOH solutions and ethylenediamine-pyrocatechol and hydrazine-water mixtures, to form preferential crystal facets. The etching processes can advantageously exploit the property that in these etchants, some crystal planes such as {111} crystal planes have a relatively high atomic densities and relatively low removal rate compared to some other crystal planes, such as {100}, {110}, {211} or {311} planes. Due to the different etch rates of different crystal planes, when a surface of a monocrystalline Si or Ge substrate is exposed to a suitable etchant, e.g., KOH, while an initial etch profile may include multiple different crystal facets, after a certain period of time, the etch profile becomes more dominated by the crystal planes having the slowest etching rates, which for Si and Ge, are {111} crystal planes. When combined with suitable masking techniques, the differential etch rates of different crystallographic planes can be used to form three-dimensional structures, e.g., blazed diffraction gratings lines comprising features that are asymmetric (e.g., that have facets, such as asymmetric facets, similar to those in the illustrated blazed diffraction grating 1008 in FIG. 10A).

FIGS. 12A-12C illustrate intermediate structures at different stages of an example process of fabricating a primary master template by utilizing different etch rates of different crystallographic planes in Si or Ge monocrystalline substrates, according to embodiments. Referring to FIG. 12A, the intermediate structure 1200A includes a monocrystalline substrate 1204, e.g., a single crystal Si substrate. The monocrystalline substrate 1204 can be oriented to have a surface having a particular crystal plane, e.g., a crystal plane belonging to one of {111}, {211}, {311}, {511}, {711} or {100} families of crystal planes. In the illustrated example, the monocrystalline substrate 1204 is a Si wafer having a {100} surface orientation. The substrate 1204 can initially have formed thereon a blanket etch mask layer 1208. The blanket etch mask layer 1208 can include one or more dielectric layers, e.g., a $SiO_2$ layer and/or a $Si_3N_4$ layer. The dielectric layer(s) can be deposited, e.g., by chemical vapor deposition, or thermally grown. To pattern the underlying blanket etch mask layer 1208, the photoresist layer 1212 may first be spin-coated on the blanket etch mask layer 1208 and subsequently patterned e.g., using a lithographic technique such as a nanoimprint or an optical lithography technique.

Referring to the intermediate structure 1200B of FIG. 12B, using the patterned photoresist layer 1212, the blanket etch mask layer 1208 can be patterned, to form a patterned etch mask layer 1208 having openings that expose the substrate 1204. In order to utilize the different etching rates of different crystallographic planes to form faceted structures, the etch mask layer 1208 may be patterned to have edges aligned in certain crystallographic directions. For example, to form faceted structures having relatively slow etching {111} planes, the edge of the etch mask layer 1208 may be oriented parallel to an intersection of the surface plane with one of the four {111} planes. For instance, on a {100} oriented silicon wafer, four planes of the {111} family of planes intersect with the {100} wafer surface at an angle of 54.7°. Thus, the etch mask layer 1208 may be patterned such that its edges are aligned with any of these intersecting lines.

Figure 13A:
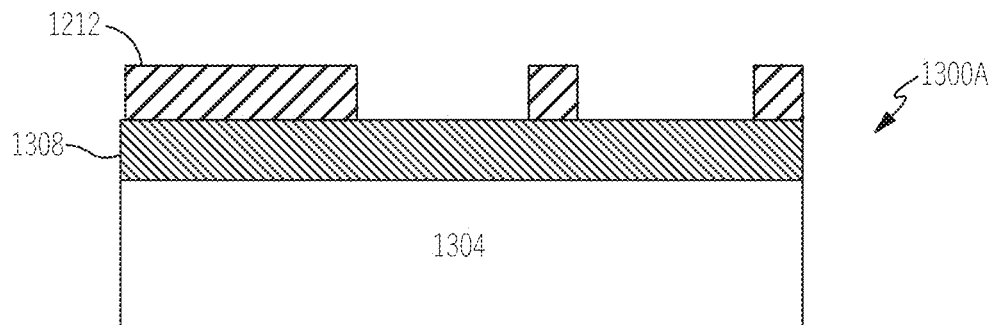
FIGS. 13A-13C schematically illustrate cross-sectional views of intermediate structures at various stages of forming a primary master template having grooves with asymmetric facets for fabricating a device master template.
Figure 13B:
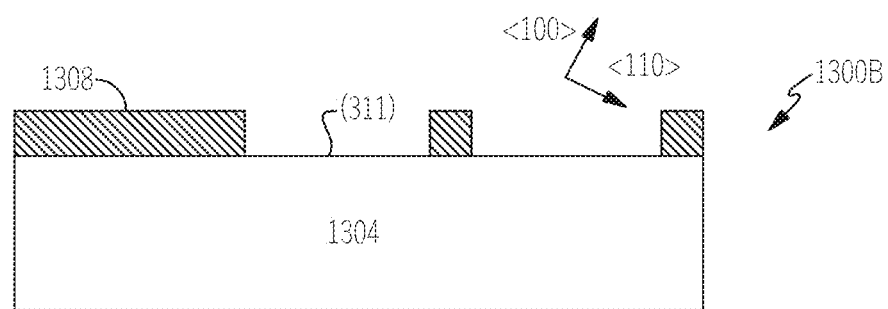
Figure 13C:
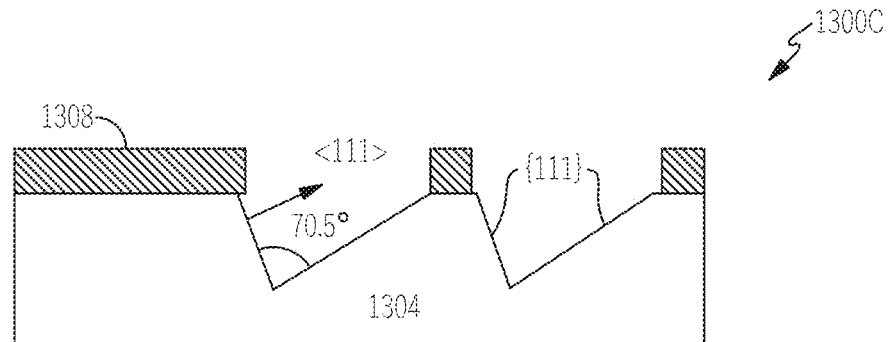

FIG. 12C illustrates the intermediate structure 1200C which results after the substrate 1204 having exposed {100} surfaces are subjected to an etchant, e.g., a solution comprising KOH in an isopropanol-water mixture at a suitable temperature, e.g., about 70° C. When the etch mask layer 1208 is arranged as a stripe-like pattern having sides that are parallel to one of the intersections of the {001} plane and the {111} planes as described above, etching the exposed surfaces of the substrate 1204 can result in, once the facets of the etch profile become dominated by rate-limiting slow-etching {111} planes, formation of a triangular trenches or V-grooves, where the facets of the triangular trenches or V-grooves may be symmetric and include one of {111} facets. As illustrated in FIG. 12C, the facets of the triangular trenches may form symmetric angles with respect to the surface of the substrate or the x-y plane, because of the angular relationship between {111} planes and the {100} planes of the substrate surface. However, embodiments are not so limited, and by choosing a substrate having a different surface orientation, the trenches or grooves can be made asymmetric and/or non-triangular. FIGS. 13A-13C illustrate an example embodiment in which the facets of the triangular trenches are asymmetric.

Some monocrystalline silicon or germanium substrates can be prepared or cut to have surfaces having certain crystallographic orientations that are less common than commonly available {100}, {110} or {111} orientations. These substrates are sometimes referred to as "off-axis" wafers and can be oriented to have surfaces such as, e.g., {211} or {311} surfaces. When these substrates are etched using an etchant as described above, different crystal facets having different angles relative to the substrate surface can be formed. Such etching characteristics can be utilized to form primary master templates having asymmetric structures, e.g., triangular lines or V-grooves having asymmetric surface angles that can be used to fabricate device master templates or intermediate master templates.

FIGS. 13A-13C illustrate intermediate structures 1300A-1300C at different stages of an example process of fabricating a primary master template substrate using an off-axis wafer substrate, according to embodiments. Referring to FIG. 13A, the intermediate structure 1300A shows a monocrystalline substrate 1304, e.g., a single crystal Si substrate having an off-axis surface. In the illustrated example, the monocrystalline substrate 1304 can represent a Si wafer having a {311} surface orientation. An etch mask layer 1308 can be patterned to have openings that expose the substrate 1304 in a similar manner as described above with respect to FIGS. 12A and 12B, and a detailed description of the process steps is not repeated here for brevity. FIG. 13C illustrates the intermediate structure 1300C which results after the substrate 1304 having exposed {311} surfaces are subjected to an etchant, e.g., a solution comprising KOH in an isopropanol-water mixture at a suitable temperature, e.g., about 70° C. When the etch mask layer 1308 is arranged as a stripe-like pattern having sides that are parallel to some intersections formed by the {311} surface plane and one of the {111} planes as described above, etching the exposed surfaces of the substrate 1304 can result in, once the facets of the etch profile become dominated by rate-limiting slow-etching {111} planes, formation of a triangular trenches or V-grooves. For example, intersections extending along <110> family of directions formed by the {311} surface plane and the {111} planes can be used. Unlike the triangular trenches or V-grooves illustrated in the intermediate structure 1200C (FIG. 12C) in which the facets of the triangular trenches or V-grooves are symmetric {111} facets, in the intermediate structure 1300C, the {111} facets form asymmetric triangular trenches or V-grooves forming a 70.5° angle with respect to each other. As illustrated in FIG. 13C, the facets of the triangular trenches may form asymmetric angles with respect to the surface of the substrate, because of the angular relationships of {111} planes relative to the {311} orientation of the substrate surface.

In the above, with respect to FIGS. 12A-12C and FIGS. 13A-13C, two example process flows that yield two different triangular trenches or V-grooves in Si substrates have been described for illustrative purposes only. However, the inventors have found that other blaze angles are achievable based on the same inventive concepts. TABLE 1 illustrates a few examples of different facet angles that are achievable using Si wafers oriented at different angles, to provide few examples.

TABLE 1

| Facet Angles Achievable Using Different Crystallographic Wafer Orientations | |
|---|---|
| Substrate Surface Crystal Plane | Blaze Angle (δ) With Respect to Substrate Surface |
| {111} | 0° |
| {211} | 19.5° |
| {311} | 29.5° |
|  | (FIG. 13C) |
| {511} | 38.9° |
| {711} | 43.3° |
| {100} | 54.7° |
|  | (FIG. 12C) |
| {522} | 25.3° |

Referring back to FIGS. 12C and 13C, in the illustrated embodiments, because of the finite widths in the x-direction of the etch mask layers 1208, 1308, adjacent triangular trenches or V grooves are separated by a flat surface at the top of the respective substrates 1204, 1304. However, embodiments are not so limited, and for various applications, it may be desirable to reduce or eliminate the flat surface between adjacent triangular trenches or V-grooves at the top of the substrate 1204, 1304. Thus, according to some embodiments, the width of the flat surface between adjacent triangular trenches may be reduced. Example processes for reducing or eliminating the flat surface between adjacent triangular trenches or V-grooves are described below with respect to FIGS. 14A-14C and FIGS. 15A-15C.

FIGS. 14A-14C illustrate an example process for reducing the flat surface between adjacent triangular trenches. Referring to FIG. 14A, relatively wide sections of an initial etch mask layer 1308 are first formed on a substrate 1304. Referring to FIG. 14B, prior to etching the substrate 1304, the relatively wide etch mask layers 1308 may be trimmed or laterally shrunk to a desirable width, e.g., by isotropic etching. Referring to FIG. 14C, after trimming to form the etch mask layers 1308 having desirable widths, the substrate 1304 may be etched to form the triangular trenches or V-grooves until facets predominantly include {111} facets, as described above.

FIGS. 15A-15C illustrate another example process for reducing the flat surface between adjacent triangular trenches, which can be employed in addition to or in lieu of the example process described with respect to FIGS. 14A-14C. In the illustrated example process, the flat region width may be reduced by, after forming the etch mask layers 1308 and forming the {111} facets as illustrated in FIGS. 15A and 15B in a similar manner as described above with respect to FIGS. 14A-14C, the substrate 1304 may further be over-etched until the triangular trenches or the V-grooves laterally etch underneath the etch mask layer 1308, as illustrated in FIG. 15C. In some embodiments, the etching of the substrate 1304 may proceed until the edges of two adjacent triangular trenches or grooves contact each other, such that the flat surface between adjacent triangular trenches is negligible, minimal or nonexistent.

Figures 16A, 16B:
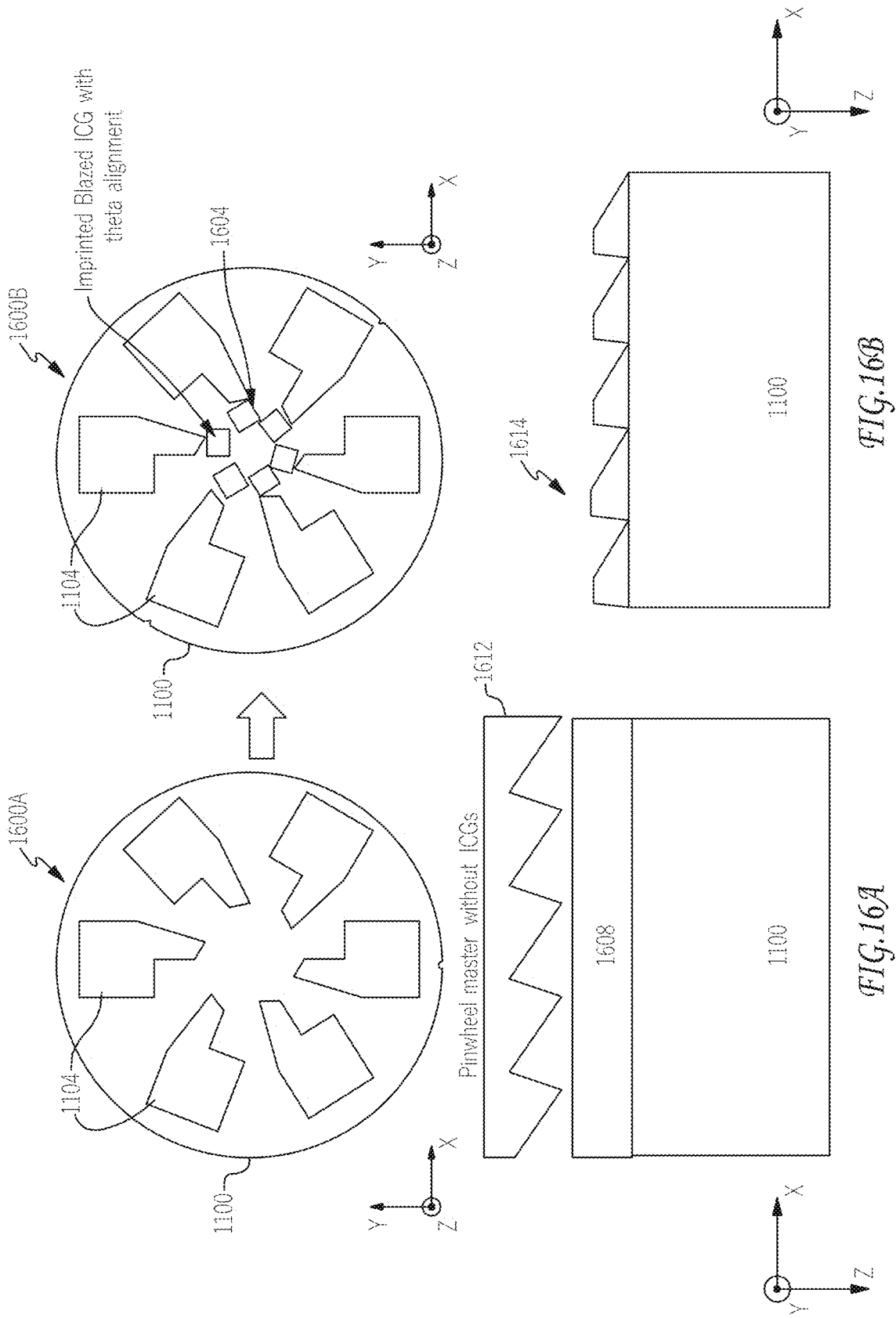

Fabrication of Device Master Templates Using Imprinted Blazed Diffraction Patterns as Partial Dry Etch Mask to Etch Device Master Template Substrate In the following, with reference to FIGS. 16A-16F, a method of fabricating a master template, e.g., a device master template for fabricating a blazed diffraction grating of a final device or an intermediate master template for fabricating another master template is described, using a primary master template fabricated according to the methods described above with respect to FIGS. 12A-12C, 13A-13C, 14A-14C and 15A-15C. The method of fabricating the device master template comprises providing a device master template substrate 1100 (FIG. 16A) and imprinting periodically repeating lines 1614 (FIG. 16B) corresponding to a blazed diffraction grating pattern on the device master template substrate 1100 in a plurality of blazed diffraction grating regions 1604 (FIG. 16B), wherein the periodically repeating lines in different ones of the blazed diffraction grating regions 1604 extend in different directions. Thereafter, the pattern of periodically repeating lines 1614 corresponding to the blazed diffraction grating pattern is transferred into the master template substrate by, e.g., dry etching using the imprinted lines as an etch template or a partial mask (FIG. 16D). Advantageously, because the periodically repeating lines are printed in desirable directions and subsequently transferred to the master template substrate 1100 by dry etching, the resulting blazed diffraction grating pattern can have lines in different ones of the blazed diffraction grating regions 1604 that are elongated in any direction, instead of being limited to directions defined by crystallographic planes as described above in fabricating the primary master template. Thus, more efficient use of the substrate area as described above with respect to FIG. 11B can be realized, thereby increasing throughput for fabricating optical elements having blazed diffraction grating. Additional details of the method of fabricating a master template are described below with respect to each of FIGS. 16A-16F.

FIGS. 16A-16E illustrate top down and cross-sectional views of intermediate structures at various stages of forming a device master template by imprinting a pattern on a device master template substrate and etching the device master template substrate using the imprinted pattern as a partial mask, according to embodiments. FIG. 16A illustrates an intermediate structure 1600A including a device master template substrate 1100 for fabricating a device master template. The upper figure illustrates a top down view of the intermediate structure 1600A, and the lower figure illustrates a side view of a region circa a region in which a blazed diffraction grating region 1604 is to be defined (FIG. 16B). The device master template substrate 1100 can be formed of any suitable material on which features can be imprinted thereon. Advantageously, because the disclosed method for formation of the blazed diffraction grating pattern of a device master template does not rely on facet formation in the substrate by wet etching, the device master template substrate 1100 does not need to be a crystalline substrate such as crystalline silicon. That is, while the device master template substrate 1100 can be a crystalline substrate, e.g., a single crystalline substrate such as a silicon wafer or a germanium wafer, embodiments are not so limited. The device master template substrate 1100 can also be formed of other suitable crystalline or noncrystalline material, including, e.g., a compound semiconductor, quartz, silica glass (e.g., doped silica glass), aluminum oxide (e.g., sapphire)), plastic, a polymer, or other material suitable for imprinting features thereon, e.g., photoresist structures, that can serve as mask features or partial mask features, as described below.

Similar to the device master template 1100B described above with respect to FIG. 11B, the illustrated intermediate structure 1600A includes a device master template substrate 1100 having defined thereon a plurality of device template regions 1104 on which various optical elements, e.g., in-coupling and/or out-coupling optical elements, are to be formed. Different ones of the device template regions 1104 arranged or extend in different non-orthogonal directions, e.g., in radial directions as illustrated. In the illustrated embodiment, the device template regions 1104 are arranged radially about a center in this example with six-fold symmetry, such that the device template regions 1104 are arranged in a pinwheel configuration. By way of example, adjacent ones of six device template regions 1104 are rotated on average by 600 relative to each other. However, embodiments are not so limited, and the device template regions 1104 can be rotated with respect to each other on average by 360°/n, where n is greater than 2, e.g., 3, 4, 5, 6, 7, 8, 9, 10, 11, 12, etc., or by an angle having any value between these values, depending on the relative size of the device template regions 1104 and the size of the substrate 1100. That is, the device template regions 1104 can be disposed in the n slices of the substrate 1100, where each of the n slices forms a sector, section, or a segment having sides that form an angle defined by 360°/n. Accordingly, in various implementations, the plurality of device template regions 1104 can be rotationally symmetric and have, for example, n-fold symmetry, e.g., 2-fold symmetry, 3-fold symmetry, 4-fold symmetry, 5-fold symmetry, 6-fold symmetry, 7-fold symmetry, 8-fold symmetry, 9-fold symmetry, 10-fold symmetry, 11-fold symmetry, 12-fold symmetry, etc. or any combination thereof as well as other values. When the adjacent device template regions 1104 are rotated by 90 degrees with respect to each other, the number of device template regions 1104 in the layout of the device master template 1100B illustrated in FIG. 11B may be four, which is matched to the number of device template regions 1104 in the layout of the device master template 1100A illustrated in FIG. 11A. When the device template regions 1104 are rotated by an angle less than 90 degrees with respect to each other, the number of device template regions 1104 in the layout illustrated in FIG. 11B can be greater than the number of device template regions 1104 in the device master template 1100A (FIG. 11A). In the illustrated embodiment, only one device template region 1104 is disposed per 360°/n sector or segment of the substrate 1100, where n=6. However, embodiments are not so limited, and in other embodiments, a plurality of device template regions 1104 can be disposed in a radial direction in each of the 360°/n sector or segment of the substrate 1100. Thus, depending on the number of sectors or sections the substrate area is divided into, and depending on the number (m) of device template regions 1104 per sector, there can be at least 2m number of device template regions 1104, e.g., 3m, 4m, 5m, 6m, 7m, 8m, 9m, 10m, 11m, 12m, etc., where m is at least 1.

In the illustrated embodiment, the device template regions 1104 are arranged rotationally-symmetrically. However, embodiments are not so limited, and in other embodiments, the device template regions 1104 can be arranged asymmetrically. For example, adjacent device template regions 1104 may be spaced by irregular angular separation or formed at different radial distances from the central axis of the substrate 1100.

Referring to FIG. 16B, an intermediate structure 1600B represents the intermediate structure 1600A after a blazed diffraction grating region 1604 is defined in or at a corresponding location with respect to each of the device template regions 1104, thereby forming a blazed diffraction grating pattern 1614 in each of the blazed diffraction grating regions 1604. The upper figure illustrates a top down view of the intermediate structure 1600B, and the lower figure illustrates a side view of a region including a portion of the blazed diffraction grating region 1604. As described above, the blazed diffraction grating pattern 1614 may be formed by a suitable imprinting technique, e.g., a nanoimprinting technique, which includes depositing a suitable blanket imprint mask layer 1608 (FIG. 16A), followed by imprinting a pattern using a primary master template 1612 as an imprint mold. The primary master template 1612 may be fabricated, e.g., by forming faceted lines in crystalline silicon according to processes described above with respect to FIGS. 12A-12C, 13A-13C, 14A-14C and 15A-15C. The primary master template 1612 serves as a nanoimprint mold, which has predefined topological patterns configured for imprinting a blazed diffraction grating pattern. The primary master template 1612 is brought into contact with and is pressed into a blanket etch mask layer 1608. The blanket etch mask layer 1608 may be formed of a suitable deformable material e.g., a polymer material such as a photoresist. For example, the blanket etch mask layer 1608 may comprise a thermoplastic polymer. The primary master template 1612 may be pressed into the blanket etch mask layer 1608 at a certain temperature, e.g., above the glass transition temperature of the blanket etch mask layer 1608. As a result, the pattern of the primary master template 1612 is transferred into the softened blanket etch mask layer 1608, thereby forming the imprinted blazed diffraction grating pattern 1614. After being cooled down, e.g., to a temperature below the glass transition temperature of the blanket etch mask layer 1608, the primary master template 1612 is separated from substrate 1100, while the imprinted blazed diffraction grating pattern 1614 is left on the substrate 1100. In the illustrated embodiment, the primary master template 1612 is pressed into the blanket etch mask layer 1608 rotatingly n number of times, where n represents the number of the blazed diffraction grating region 1604 that are formed. The blazed diffraction grating patterns 1614 comprising the periodically repeating lines may thus be serially imprinted in different locations corresponding to the plurality of device template regions 1104 by repeatedly contacting and pressing the primary master template 1612 at the different locations.

After forming the n number of blazed diffraction grating regions 1604, in some techniques, after being pressed into the blanket etch mask layer 1608, the imprinted blazed diffraction grating pattern 1614 may be hardened by cross-linking under UV light.

Still referring to FIG. 16B, thus formed blazed diffraction grating regions 1604 define substrate areas in which lines of the blazed diffraction grating pattern 1614 are formed. As discussed above, advantageously, because the blazed diffraction grating pattern 1614 comprising periodically repeating lines are imprinted rather than wet-etched into a crystalline substrate, the lines of the blazed diffraction grating pattern 1614 can be elongated in any suitable direction as described above with respect FIG. 11B, instead of being limited to crystallographic directions of a crystalline substrate, as described above with respect to FIG. 11A, in which lines of each of blazed diffraction grating regions 1008 extend in the same direction. As described above with respect to FIG. 11B, advantageously, because the blazed diffraction grating patterns 1614 are printed, different ones of the blazed diffraction grating regions 1604 can extend in any suitably different directions. In the illustrated embodiment, the lines of different ones of the blazed diffraction grating regions 1604 extend in different radial directions. When the lines of the blazed diffraction grating regions 1604 are allowed to extend in different directions, the device template regions 1104 can be arranged such that the area of the substrate 1104 is utilized much more efficiently, e.g., as in the illustrated "pinwheel" configuration, similar to that described above with respect to FIG. 11B. In some such configurations, the angular separation between adjacent device template regions 1104 may be equal, however, in other configurations the angular separation between adjacent device template regions 1104 may be unequal. For example, the angular spacing between two or more (possibly all) device template regions 1104 may be unequal.

Referring to FIG. 16C, an intermediate structure 1600C is illustrated, which represents the intermediate structure 1600B (FIG. 16B) after covering substantially the entire surface of the substrate 1104 with a masking layer 1618, e.g., by spin-coating a photoresist layer, and locally opening the masking layer 1618 at areas corresponding to the blazed diffraction grating regions 1604, thereby exposing the imprinted blazed diffraction grating patterns 1614, while leaving other regions covered by the masking layer 1618. The openings may be formed, e.g., by locally exposing the blazed diffraction grating region and developing to locally remove the masking layer 1618 from the blazed diffraction grating regions 1604. The upper figure illustrates a top down view of the intermediate structure 1600C, and the lower figure illustrates a side view of a region including a portion of the blazed diffraction grating region 1604.

After locally exposing the imprinted blazed diffraction grating pattern 1614, the intermediate structures 1600C (FIG. 16C) is placed in an etching reactor, e.g., a plasma reactor configured for gas-phase plasma etching. In the plasma reactor, the imprinted blazed diffraction grating pattern 1614 is used as a partial etch mask layer to at least partially transfer the structure of the imprinted blazed diffraction grating pattern 1614 into the underlying substrate 1100 at exposed regions of the imprinted blazed diffraction grating pattern 1614. The remaining regions remain covered by the masking layer 1618, which serves as a complete etch mask layer to protect the remaining regions outside of the blazed diffraction grating regions 1604.

As described herein, a partial etch mask layer refers to a mask layer having at least part of the layer that is not intended to maintain coverage of the underlying substrate against the etchants throughout the entire duration of an etch process. Instead, at least some parts of the partial etch mask layer are designed to be removed completely sometime during the etch process, such that the corresponding underlying substrate is partially removed during the etch process. For example, in FIG. 16C, when the imprinted blazed diffraction grating pattern 1614 is exposed to an etchant under a condition in which materials of both the imprinted blazed diffraction grating pattern 1614 and the substrate 1100 can be removed, portions of the imprinted blazed diffraction grating pattern 1614 having a relatively smaller thickness are removed first, thereby exposing the corresponding underlying substrate 1100 relatively early on in the etch process. Upon exposure, the exposed substrate regions start to get etched. Thereafter, different portions of the imprinted blazed diffraction grating pattern 1614 having greater thicknesses are removed at different times, thereby exposing the corresponding underlying substrate relatively at different times later in the etch process. The result is that the pattern of the imprinted grating pattern 1614 is at least qualitatively transferred to the underlying substrate 1100.

Referring to FIG. 16D, an intermediate structure 1600D represents the intermediate structure 1600C (FIG. 16C) after substantially transferring the imprinted blazed diffraction grating pattern 1614 (FIG. 16C) into the underlying substrate 1100 using the imprinted grating pattern 1614 as a partial mask. The resulting intermediate structure 1600D comprises a dry-etched blazed diffraction grating pattern 1620. The upper figure illustrates a top down view of the intermediate structure 1600D, and the lower figure illustrates a side view of a region including a portion of the blazed diffraction grating region 1604 comprising the dry-etched blazed diffraction grating pattern 1620 that is patterned into the substrate 1100.

Referring back to FIGS. 16C and 16D, in the illustrated process, the imprinted blazed diffraction grating pattern 1614 is substantially transferred to the underlying substrate 1100, such that the resulting dry-etched blazed diffraction grating pattern 1620 has substantially the same shape as the imprinted blazed diffraction grating pattern 1614. However, embodiments are not so limited and in other embodiments, the dry-etched blazed diffraction grating pattern 1620 can deviate from the original shape of the imprinted blazed diffraction grating pattern 1614. For example, by controlling the relative etch rates of the materials of the imprinted blazed diffraction grating pattern 1614 versus the substrate 1100, the final shape of the dry-etched blazed diffraction grating pattern 1620 can be controlled. For example, depending on the etch chemistry, parameters such as the blaze angle δ, the line width and/or the width of the flat region between adjacent facets in the dry-etched blazed diffraction grating pattern 1620 can be different, e.g., be smaller, than the corresponding features in the imprinted blazed diffraction grating pattern 1614 by 5%, 10%, 20%, 30%, 40%, 50%, or any percentage between these or outside these percentages. In addition, the corners of the lines of the dry-etched blazed diffraction grating pattern 1620 may be smoothed relative to the corresponding corners of the lines of the imprinted blazed diffraction grating pattern 1614.

Referring to FIG. 16E, an intermediate structure 1600E represents the intermediate structure 1600D (FIG. 16D) after removing the masking layer 1618 from the remaining regions outside of the dry-etched blazed diffraction grating pattern 1620. The upper figure illustrates a top down view of the intermediate structure 1600E, and the lower figure illustrates a side view of a region including a portion of the blazed diffraction grating region 1604 comprising the dry-etched blazed diffraction grating pattern 1620. The masking layer 1618 may be removed using a suitable dry and/or wet process. For example, when the masking layer 1618 is formed of photoresist, it may be removed by a resist stripping or ashing process in which an oxidizing reactive species such as reactive oxygen or fluorine species, e.g., oxygen or fluorine free radicals, are used to form volatile gases and pumped away. The ashing or stripping process may be performed at a relatively high temperature to remove a bulk of the photoresist, followed by a descum process used to remove residual photoresist in the trenches. After removing the masking layer 1618, the intermediate structure 1600E may be cleaned in a suitable wet cleaning solution.

FIG. 16F illustrates a scanning electron microscope (SEM) image of an actual dry-etched blazed diffraction grating pattern resulting from a fabrication process flow described above with respect to FIGS. 16A-16E.

Thus fabricated dry-etched blazed diffraction grating pattern 1620 on respective ones of the portions of the blazed diffraction grating region 1604 of the intermediate structure 1600E can in turn be used as a master template to form a blazed diffraction grating pattern on a final device substrate, e.g., a waveguide. The blazed diffraction grating pattern on the final device substrate may be formed using a suitable imprinting technique, e.g., a nanoimprinting technique similar to that described above with respect to FIGS. 16A-16B. Other processes are possible.

In various embodiments disclosed herein, the final device substrate can be formed of a high refractive index material. A high refractive index device substrate can provide various advantages. For example, when the high index substrate serves as a waveguide having a relatively high refractive index, e.g., 2.0 or greater, the high index substrate can provide a relatively high field of view, among other advantages. In some embodiments, to efficiently couple light into the high refractive index waveguide, the diffractive optical coupling elements also have a correspondingly high refractive index. To achieve this goal, among other advantages, some displays for AR systems according to embodiments described herein include a waveguide comprising a relatively high index (e.g., greater than or equal to 2.0) material, having formed thereon respective diffraction gratings with correspondingly high refractive index, such a Li-based oxide. For example, a diffraction grating may be formed on a waveguide by patterning a surface portion of the waveguide formed of a high index material. As described herein, a high index material can have an index of refraction of at least 1.9, 2.0, 2.1, 2.3, 2.5, 2.7, or a value in a range defined by any of these values. A diffractive grating may, for example, be formed in a high index material such as $ZrO_2$, $TiO_2$, SiC, or Li-based oxide waveguide such as lithium niobate or lithium tantalate by patterning the high index material-based waveguide with a blazed geometry.

Figure 17A:
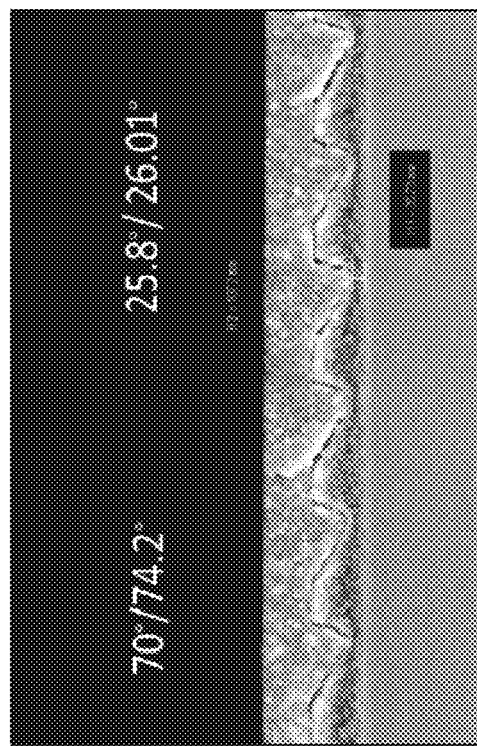
FIGS. 17A and 17B are scanning electron microscope images of blazed diffraction grating patterns that are formed using the dry-etched blazed diffraction grating pattern illustrated in FIG. 16F as a device master template.
Figure 17B:

FIGS. 17A and 17B illustrate SEM images of actual blazed diffraction grating patterns formed on a device substrate imprinted using a dry-etched blazed diffraction grating pattern similar to that shown in FIG. 16F as a device master template. The blazed diffraction grating patterns can be part of an optical element such as an in-coupling optical grating (ICG) as discussed above, for example.

In the above example, the lines of the dry-etched blazed diffraction grating pattern such as those described with respect to FIGS. 16A-16F have a relatively simple blazed diffraction grating structure having two major sloped facets with or without a flat region therebetween. However, embodiments are not so limited, and the blazed diffraction grating patterns can have lines having different shapes. FIGS. 18A-18B illustrate cross-sectional views of intermediate structures 1814, 1820 at different stages of forming a device master template by imprinting a pattern on a substrate and etching the substrate using the imprinted pattern as a partial mask to produce lines having alternative shapes, according to embodiments. FIGS. 18A and 18B illustrate intermediate structures 1814, 1820 corresponding to processing steps described above with respect to FIGS. 16C and 16D. In the intermediate structures illustrated in FIGS. 18A and 18B, unlike the intermediate structure illustrated with respect to FIGS. 16C and 16D, the lines of the imprinted blazed diffraction grating pattern 1814 (FIG. 18A) and the corresponding dry-etched blazed diffraction grating pattern 1820 (FIG. 18B) have a stepped-structure. While the shapes are different, the principles and steps of their fabrication are similar to those described above with respect to FIGS. 16A-16F, the details of which are not repeated here for brevity.

Figure 19B:
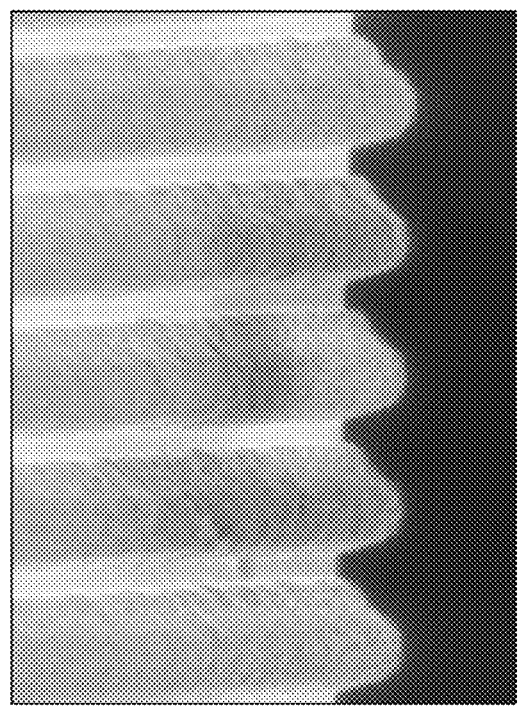
FIG. 19B is a scanning electron microscope image of a blazed diffraction grating pattern that has been formed using the dry-etched blazed diffraction grating pattern illustrated in FIG. 19A as a device master template.
Figure 19A:
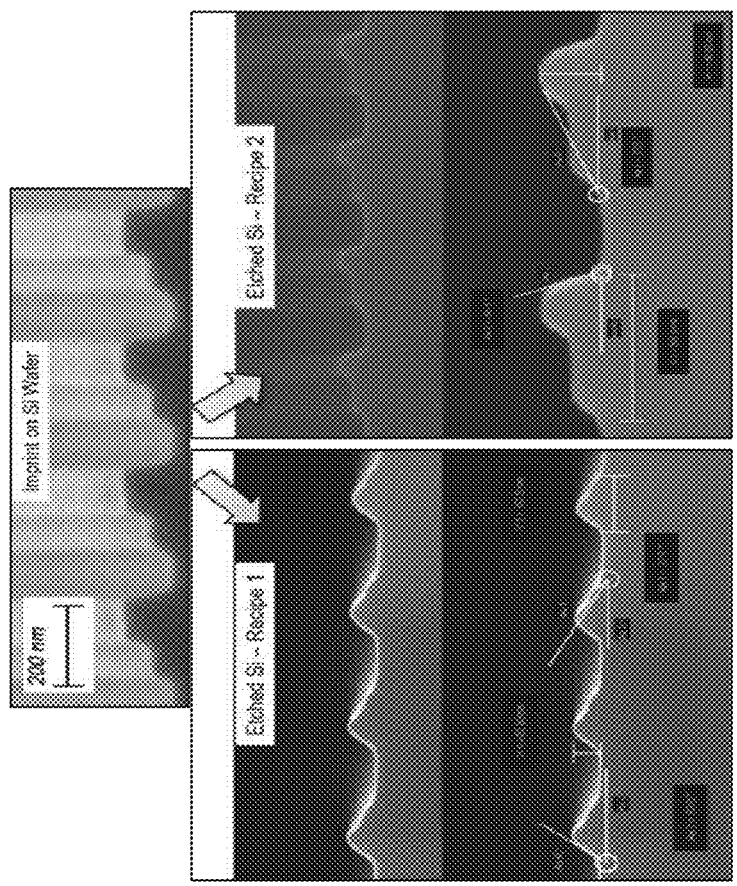
FIG. 19A illustrates scanning electron microscope images of blazed diffraction grating patterns of device master templates resulting from a fabrication process flow illustrated above with respect to 18A-18B.

FIG. 19A shows SEM images of actual intermediate structures resulting from fabrication process flows similar to that described above with respect to FIGS. 18A-18B, which result in a device master template in which the lines of the blazed diffraction grating pattern have a stepped structure. While the illustrated lines have two steps, embodiments are not so limited, and additional steps may be formed. As illustrated and described above, by controlling the relative etch rates of the materials of the imprinted blazed diffraction grating pattern 1814 versus the substrate 1100, the final shape of the dry-etched blazed diffraction grating pattern 1820 can be controlled. For example, depending on the etch chemistry, parameters such as the angles and widths of the steps as well as the overall line width between the dry-etched blazed diffraction grating pattern 1820 can be different than the corresponding features in the imprinted blazed diffraction grating pattern 1814. In addition, the corners of the lines of the dry-etched blazed diffraction grating pattern 1820 may be smoothed relative to the lines of the imprinted blazed diffraction grating pattern 1814. The left and right SEM images represent intermediate structures resulting from two different dry etch recipes from the same imprinted blazed diffraction grating pattern.

FIG. 19B is an SEM image of an actual blazed diffraction grating pattern, which can be part of an in-coupling optical grating (ICG), that has been formed using the dry-etched blazed diffraction grating pattern illustrated in FIG. 19A as a device master template.

Figure 20:
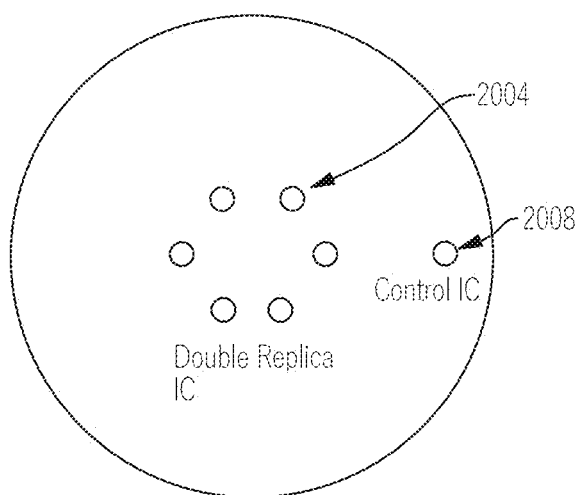
FIG. 20 illustrates a schematic full wafer representation of locations of experimental example diffraction gratings fabricated by imprinting using a device master template.

FIG. 20 illustrates a schematic full wafer representation of locations of experimental example blazed diffraction gratings 2004 ("double replica in-coupling (IC) optical grating") fabricated by imprinting using a device master template fabricated according to embodiments. Each of the blazed diffraction gratings 2004 is similar to those shown in FIGS. 17A and 17B, and was fabricated on a 1500 mm high index glass wafer (n~1.8) using a device master template fabricated using a process similar to that described above with respect to FIGS. 16A-16E. As a comparison, a control diffraction grating 2008 ("control in-coupling (IC) optical grating") was also fabricated on the same wafer substrate using a direct imprinting technique from a primary master template. On average, the experimental blazed diffraction gratings 2004 fabricated using the device master template fabricated according to embodiments of the processes described herein showed matching performance compared to the control diffraction grating 2008 fabricated directly from the primary master template.

Fabrication of Device Master Templates by Coating Imprinted Blazed Diffraction Patterns As described above, e.g., with respect to FIGS. 16C and 16D, imprinted blazed diffraction grating pattern 1614 formed of a material that can serve as an etch mask, e.g., a photoresist material, can advantageously be used as a partial etch mask to etch the underlying substrate. The resulting dry-etched blazed diffraction grating pattern 1620 serves as a rigid device master template for imprinting blazed diffraction grating patterns on device substrates. As an alternative process, instead of dry-etching to etch the blazed diffraction grating pattern into the substrate, the imprinted blazed diffraction grating pattern 1614 itself can be made rigid, e.g., by coating, and be used as a device master template for imprinting blazed diffraction grating patterns on device substrates, as described below.

FIGS. 21A and 21B illustrate a process flow for fabricating a device master template by imprinting a blazed diffraction grating pattern on a device master substrate and coating the pattern with hard thin film, and using the resulting device master template to imprint a blazed diffraction grating on a device substrate, according to embodiments. Referring to FIG. 21A, the process includes providing a primary master template 2104 (a cross sectional view), which includes a blazed diffraction grating pattern that is fabricated by forming faceted lines in crystalline silicon according to a process similar to those described above with respect to FIGS. 12A-12C, 13A-13C, 14A-14C and 15A-15C, the details of which are not repeated here for brevity. The primary master template 2104 serves as a nanoimprint mold, which has predefined topological patterns (represented as the region having faceted triangular topology) configured for imprinting a blazed diffraction grating pattern, as described above with respect to FIG. 16A. In the illustrated embodiment, the primary master template 2104 includes, in addition to the blazed diffraction grating pattern including the faceted lines, other device patterns (represented as the region having rectangular topology). The blazed diffraction grating pattern may serve as a mold for one of the optical elements, e.g., an in-coupling optical element, while the other device patterns can include various other optical elements or non-optical elements. For example, other optical elements may include light distributing elements (730, 740, 750, FIGS. 9A-9C), and/or out-coupling optical elements (800, 810, 820, FIGS. 9A-9C).

Still referring to FIG. 21A, using the primary master template 2104, an intermediate structure 2108A/2108B of a device master template comprising a plurality of device template regions 1104 is fabricated. The lower intermediate structure 2108B represents a top view showing the entire substrate of a device master template including a plurality of device template regions 1104, while the upper intermediate structure 2108A represents a side view showing a portion of one of the device template region 1104 including a blazed diffraction grating pattern region 2112A and a pattern region 2112B for other optical elements. The intermediate structure 2108A/2108B includes an imprinted pattern layer 2112, which may be formed using the primary master template 2104 through a nanoimprint process similar to that described above with respect to FIGS. 16A and 16B, the details of which are not repeated here for brevity. Unlike FIG. 16B, in the illustrated embodiment, the imprinted pattern 2112 of the intermediate structure 2108A/2108B includes, in addition to the blazed diffraction grating pattern region 2112A (1604 in FIG. 16B), the pattern region 2112B for other optical elements. When the blazed diffraction grating pattern region 2112A is configured to form one of the optical elements, e.g., an in-coupling optical element, the pattern region 2112B can be configured to form various other optical elements or non-optical elements, e.g., light distributing elements and/or out-coupling optical elements.

As described above with respect to FIG. 16A, the primary master template 2104 is pressed into a blanket etch mask layer, e.g., a photoresist layer, n number of times at different portions of the blazed diffraction grating regions, where n represents the number of the device template regions 1104 that are formed. When the device template regions 1104 are disposed in a pinwheel configuration in a similar manner as described above with respect to FIG. 16B, the primary master template 2104 may be rotated around the substrate between different pressings into the blanket etch mask layer, in a manner described above with respect to FIG. 16B, the details of which are not repeated here for brevity.

Referring to FIG. 21B, after forming the n number of device template regions 1104 each including the imprinted pattern layer 2112, which includes the blazed diffraction grating region 2112A and the pattern region 2112B for other optical elements, the surface of the imprinted pattern layer 2112 is coated with a coating 2120 to complete fabrication of a device master template 2116. The illustrated device master template 2116 represents the intermediate structure 2108A illustrated in FIG. 21A, after forming the coating layer 2120. The coating 2120 may be formed of any suitable material that provides suitable hardness and rigidity to the imprinted pattern layer 2112 such that the resulting coated imprinted pattern layer 2112 can serve as a device master template. The suitable material may be a dielectric material including, e.g., $SiO_2$, $Si_3N_4$, SiC, $HfO_2$, $Al_2O_3$, etc., a semiconductor material including, e.g., silicon, germanium, etc., a metal including, e.g., tungsten, aluminum, copper, titanium, gold, chromium, etc., a metal nitride, e.g., TiN, or a metal alloy including, e.g., AuPd and PdAgCu. A suitable process for forming the coating 2120 includes chemical vapor deposition (CVD), plasma-enhanced chemical vapor deposition (PE-CVD), high density chemical vapor deposition (HDP-CVD), thermal atomic layer deposition (ALD), plasma-enhanced atomic layer deposition (PE-ALD), spin-on dielectric processes (SOD), and physical vapor deposition (PVD), among others. A suitable process for forming the coating 2020 may be a low temperature (e.g., <450° C.) process such that the imprinted pattern layer 2112 is not damaged or excessively oxidized during the coating process. The coating 2120 provides sufficient mechanical rigidity and hardness such that the coated imprinted pattern layer 2112 can serve as a device master template pattern. Forming the coating 2120 completes the fabrication of the device master template 2116.

Still referring to FIG. 21B, using the device master template 2116 having the coated imprinted pattern layer 2112 formed thereon, a final device pattern layer 2132 may be formed on a device substrate 2124A/2124B. The lower device substrate 2124B represents a top view of the device substrate including a plurality of device regions 2128, while the upper device substrate 2124A represents a side view of the device substrate showing a portion of one of the device regions 2128. The device substrate 2124A shows the device pattern layer 2132 including a blazed diffraction grating region 2132A and a region 2132B that includes other optical elements. The device pattern layer 2132 may be formed using the device master template 2116 through a nanoimprint process similar to that described above with respect to FIGS. 16A and 16B, the details of which are not repeated here for brevity. Thus fabricated device substrate 2124A/2124B has formed thereon n number of device regions 2128 each including the device pattern layer 2132, which includes the blazed diffraction grating region 2132A and the region 2132B that includes other optical elements. For example, the blazed diffraction grating region 2132A can form part of one of an in-coupling optical element, e.g., ICG, and an out-coupling optical element, e.g., EPE, while the region 2132B can form part of the other of the in-coupling optical element, e.g., ICG, and the out-coupling optical element, e.g., EPE, as well as light distributing elements and other optical elements.

FIGS. 22A-22D illustrate an alternative process flow for fabricating a device master template and a blazed diffraction grating on a device substrate. Similar to the process flow described above with respect to FIGS. 21A and 21B, the process flow includes imprinting a blazed diffraction grating pattern on a device master substrate and coating the pattern with a hard thin film, and using the resulting device master template to imprint a blazed diffraction grating on a device substrate. However, unlike the process flow of FIGS. 21A and 21B, in the process flow described with respect to FIGS. 22A-22D, the blazed diffraction grating pattern region 2112A (FIG. 21A) and a pattern region 2112B (FIG. 21A) for other optical elements are formed at separate process steps using intermediate master templates, as described below.

Referring to FIG. 22A, the process includes providing a primary master template 2204 (a cross sectional view), which includes a blazed diffraction grating pattern that is fabricated by forming faceted lines in crystalline silicon according a process similar to those described above with respect to FIGS. 12A-12C, 13A-13C, 14A-14C and 15A-15C, the details of which are not repeated here for brevity. The primary master template 2204 serves as a nanoimprint mold for imprinting a blazed diffraction grating pattern, as described above with respect to FIG. 21A. However, unlike the master template described above with respect to FIG. 21A, in the illustrated embodiment, the primary master template 2204 includes the blazed diffraction grating pattern including the faceted lines, while not including other device patterns. Using the primary master template 2204, an intermediate structure 2208A, 2208B of an intermediate master template comprising a plurality of device template regions is fabricated. The lower intermediate structure 2208B represents a top view showing the entire substrate of a device master template including a plurality of device template regions, while the upper intermediate structure 2208A represents a side view showing a portion of one of the device template region including the blazed diffraction grating pattern region. The intermediate structure 2208A/2208B includes an imprinted pattern layer, which may be formed using the primary master template 2204 through a nanoimprint process similar to that described above with respect to FIGS. 16A and 16B, the details of which are not repeated here for brevity. As described above with respect to FIG. 16A, the primary master template 2204 is pressed into a blanket etch mask layer, e.g., a photoresist layer, n number of times at different portions of the blazed diffraction grating regions, where n represents the number of the device template regions that are formed. When the device template regions are disposed in a pinwheel configuration in a similar manner as described above with respect to FIG. 16B, the primary master template 2204 may be rotated around the substrate between different pressings into the blanket etch mask layer in a manner described above with respect to FIG. 16B, the details of which are not repeated here for brevity.

Referring to FIG. 22B, after forming the n number of device template regions each including the blazed diffraction grating region, the surface of the imprinted pattern layer is costed with a coating (represented by the thick black line) using a process and material similar to that described above with respect to FIG. 21B, the details of which are not repeated here for brevity. The coating completes a second master template 2212, which is an intermediate master template. Using the second master template 2212, an intermediate structure 2216A (side view)/2216B (top view) for a third master template is fabricated. The intermediate structure 2216A/2216B is fabricated by imprinting a blazed diffraction grating pattern on a substrate having pre-formed thereon a pattern region similar to the pattern region 2112B (FIG. 21A) for other optical elements.

Referring to FIG. 22C, after the intermediate structure 2216A/2216B is fabricated by imprinting the blazed diffraction grating pattern on the substrate having pre-formed thereon a pattern region, the surface of the imprinted pattern layer is costed with a coating (represented by the thick black line) using a process similar to that described above with respect to FIG. 21B, the details of which are not repeated here for brevity. The coating completes a third master template 2220, which is an intermediate master template. Using the third master template 2220, an intermediate structure 2108A (side view)/2108B (top view) for a fourth master template is fabricated. The intermediate structure 2108A/2108B is fabricated by imprinting a blazed diffraction grating pattern and a pattern on a device master substrate. At this stage, the intermediate structure 2108A/2108B is identical to the intermediate structure 2108A/2108B described above with respect to FIG. 21A, which includes a blazed diffraction grating pattern region 2112A and a pattern region 2112B for other optical elements.

Referring to FIG. 22D, a coating 2120 is formed on the intermediate structure 2108A/2108B to form a device master template 2116 in a similar manner as described above with respect to FIGS. 21A and 21B. Thereafter, using the device master template 2116 having the coated imprinted pattern layer 2112 formed thereon, final device pattern layer 2132 may be formed on a device substrate 2124A/2124B, in a similar manner as described above with respect to FIGS. 21A and 21B, the details of which are not repeated here for brevity. Thus fabricated, device substrate 2124A/2124B has formed thereon n number of device regions 2128 each including the device pattern layer 2132, which includes the blazed diffraction grating region 2132A and the region 2132B that includes other optical elements. For example, the blazed diffraction grating region 2132A can form part of one of an in-coupling optical element, e.g., ICG, and an out-coupling optical element, e.g., EPE, while the region 2132B can form part of the other of the in-coupling optical element, e.g., ICG, and the out-coupling optical element, e.g., EPE, as well as light distributing elements and other optical elements.

Blazed Diffraction Grating Structures Fabricated Using Device Master Templates Fabricated by Imprinting The blazed diffraction gratings that are fabricated using device master templates described above can have various dimensions and configurations, which are described in reference to FIG. 10A. Referring back to FIG. 10A, the blazed diffraction grating lines 1012 can have a height (H) that is 5 nm to 50 nm, 50 nm to 100 nm, 100 nm to 150 nm, 150 nm to 200 nm, 200 nm to 250 nm or a height in a range defined by any of these values, according to embodiments. The blazed diffraction grating lines 1012 can periodically repeat at a pitch d of 100 nm to 200 nm, 200 nm to 300 nm, 300 nm to 400 nm, 400 nm to 500 nm, of 500 nm to 600 nm, 600 nm to 700 nm, 700 nm to 800 nm, 800 nm to 900 nm, 900 nm to 1 µm, or a pitch in any range defined by any of these values, according to various embodiments.

As described above, the blazed diffraction grating lines 1012 can have one of a plurality of facets, e.g., two facets in the illustrated embodiment, that is formed at relatively shallow angle δ relative the plane of the substrate at an angle of about 20°, 30 40°, 50°, 60°, or any value in a range defined by these values. For example, as illustrated in TABLE 1, when the substrate is a silicon wafer in which the facets are formed to form the lines 1012 are cut to have {211}, {311}, {511}, {711} or {100} surface planes, the resulting angle δ can be about 22.4°, 29.5°, 38.9°, 43.3° or 54.7°, respectively. Values outside the above-indicated angles are also possible.

According to various embodiments, when configured as an in-coupling optical element or an in-coupling diffraction grating, thus formed blazed diffraction grating structure can diffractively couple light incident into the substrate 1004 as illustrated in FIG. 10B, which can be a waveguide as described above. On the other hand, when configured as an out-coupling optical element, thus formed blazed diffraction grating structure can diffractively couple light from the substrate 1004, which can be a waveguide described above, within the field of view of the user.

A wide range of variations are possible. For example, although blazed diffractions grating are discussed above, the diffractive features may be different and the diffraction grating need not be blazed. Additionally, in any of the processes described herein, the features formed may be a positive or a negative. For example, in any of the processes described herein, the features formed may correspond to the diffraction pattern of the diffraction grating or may be the negative thereof. Such negative patterns may be used to form a positive pattern in an intermediate template or the diffraction grating itself. Additionally, any number of intermediate structures such as intermediate master templates may be used in a given process. Such intermediate structures, e.g., intermediate master templates, may include a positive or a negative of the diffraction pattern formed in the final device. Still other variations are possible.

Additional Examples

1. A method of fabricating a blazed diffraction grating, the method comprising:
   providing a master template substrate;
   imprinting periodically repeating lines on the master template substrate in a plurality of master template regions, wherein the periodically repeating lines in different ones of the master template regions extend in different directions; and
   using at least one of the master template regions as a master template to imprint at least one blazed diffraction grating pattern on a grating substrate.

2. The method of Example 1, wherein the periodically repeating lines in different ones of the master template regions extend in non-orthogonal directions.

3. The method of any one of the preceding Examples, wherein the periodically repeating lines in adjacent ones of the master template regions extend in directions that form an angle between zero and 90 degrees.

4. The method of any one of the preceding Examples, wherein the periodically repeating lines in different ones of the master template regions extend in different radial directions with respect to a central axis of the master template substrate.

5. The method of any one of the preceding Examples, wherein imprinting periodically repeating lines on the master template substrate comprises imprinting in at least four master template regions.

6. The method of any one of the preceding Examples, wherein imprinting the periodically repeating lines comprises imprinting over a silicon surface of the master template substrate.

7. The method of any one of the preceding Examples, wherein imprinting the periodically repeating lines comprises imprinting over a silicon oxide surface of the master template substrate.

8. The method of any one of the preceding Examples, wherein imprinting the periodically repeating lines on the master template substrate comprises serially imprinting in different ones of the plurality of master template regions using the same primary master template.

9. The method of any one of the preceding Examples, wherein the periodically repeating lines formed on the master template substrate has a sawtooth profile.

10. The method of any one of the preceding Examples, wherein the periodically repeating lines formed on the master template substrate comprise symmetric opposing side surfaces forming similar angles with respect to a plane of the master template substrate.

11. The method of any one of the preceding Examples, wherein the periodically repeating lines formed on the master template substrate comprise asymmetric opposing side surfaces forming different angles with respect to a plane of the master template substrate.

12. The method of any one of the preceding Examples, wherein the periodically repeating lines formed on the master template substrate comprise opposing side surfaces having different slopes with respect to a major surface plane of the master template substrate.

13. The method of any one of the preceding Examples, wherein the periodically repeating lines formed on the master template substrate comprise a side surface having a stepped structure.

14. The method of any one of the preceding Examples, wherein the periodically repeating lines formed on the master template substrate comprise a polymeric material.

15. The method of any one of the preceding Examples, wherein the periodically repeating lines formed on the master template substrate comprise a dielectric material.

16. The method of any one of the preceding Examples, further comprising coating the periodically repeating lines formed on the master template substrate with a dielectric material.

17. The method of any one of Examples 1 to 15, further comprising coating the periodically repeating lines formed on the master template substrate with a metal oxide or a metal nitride.

18. The method of any one of Examples 1 to 15, further comprising coating the periodically repeating lines formed on the master template substrate with a metal or a metal alloy.

19. The method of any one of the preceding Examples, further comprising transferring a pattern corresponding to the periodically repeating lines into the master template substrate.

20. The method of Example 19, wherein transferring the pattern comprises using the periodically repeating lines as a partial mask to dry etch the master template substrate.

21. The method of Example 20, wherein dry etching comprises locally dry etching the master template regions.

22. The method of any one of the preceding Examples, wherein imprinting the periodically repeating lines comprises imprinting using a primary master template comprising periodically repeating lines formed on a primary master substrate.

23. The method of Example 22, wherein the periodically repeating lines formed on the primary master substrate has a sawtooth profile.

24. The method of Examples 22 or 23, wherein the periodically repeating lines formed on the primary master substrate comprise asymmetrically oriented side surfaces.

25. The method of Examples 22 or 24, wherein the primary master substrate comprises a silicon substrate.

26. The method of any one of Examples 22 to 25, wherein the primary master substrate is a silicon substrate comprising a major surface having a (311) crystal orientation.

27. The method of Example 26, wherein the periodically repeating lines formed on the primary master substrate comprise a facet having a (111) crystal orientation.

28. The method of any one of Examples 25 to 27, further comprising forming the primary master template by lithographically patterning and etching the silicon substrate.

29. The method of Example 28, wherein etching the silicon substrate comprises wet etching.

30. The method of Examples 22 or 23, wherein the periodically repeating lines formed on the primary master substrate comprise a polymeric material coated with a dielectric material.

31. The method of any one of the preceding Examples, wherein the grating substrate is a transparent substrate.

32. The method of any one of the preceding Examples, wherein the grating substrate has a refractive index greater than about 1.4.

33. The method of any one of the preceding Examples, wherein the grating substrate comprises a waveguide.

34. The method of Example 33, wherein the blazed diffraction grating comprises an incoupling grating configured to incouple light into the waveguide.

35. The method of Example 33, wherein the blazed diffraction grating comprises an outcoupling grating configured to outcouple light from the waveguide.

36. The method of Example 33, wherein the blazed diffraction grating comprises a light distributing element configured to distribute and propagate light within the waveguide towards an outcoupling element.

37. The method of Example 33, wherein the blazed diffraction grating serves as a combined outcoupling grating and light distributing element configured to distribute and propagate light within the waveguide and further configured to outcouple the light from the waveguide.

38. The method of any one of the preceding Examples, wherein the blazed diffraction grating pattern has a geometry configured to have a first order diffraction efficiency greater than 50% for at least one polarization of light.

39. The method of any one of the preceding Examples, wherein imprinting at least one blazed diffraction grating pattern comprises simultaneously imprinting two or more blazed diffraction grating patterns.

40. The method of any one of the preceding Examples, wherein the at least one blazed diffraction grating pattern comprises a plurality of straight lines.

41. The method of any one of Examples 1 to 39, wherein the at least one blazed diffraction grating pattern comprises a plurality of discontinuous lines.

42. The method of any one of Examples 1 to 39, wherein the at least one blazed diffraction grating pattern comprises a plurality of pillars protruding from a surface of the grating substrate 43. The method of any one of Examples 1 to 39, wherein the at least one blazed diffraction grating pattern comprises a plurality of straight lines, wherein at least some of the straight lines have different widths.

44. The method of any one of Examples 1 to 39, wherein the at least one blazed diffraction grating pattern comprises diffractive features arranged as a one-dimensional (1D) array having a periodicity in one lateral direction.

45. The method of Example 44, wherein the 1D array serves as a 1D grating configured to diffract light preferentially in one direction.

46. The method of any one of Examples 1 to 39, wherein the at least one blazed diffraction grating pattern comprises diffractive features arranged as a two-dimensional (2D) array having periodicities in two lateral directions.

47. The method of Example 46, wherein the 2D array serves as a 2D grating configured to diffract light preferentially in two directions.

48. The method of Example 46, wherein the 2D array comprises the same number of diffractive features in two different lateral directions.

49. A method of fabricating a master template for imprinting a blazed diffraction grating, the method comprising:
providing a master template substrate;
providing a primary master template comprising periodically repeating lines formed on a primary master substrate; and
imprinting periodically repeating lines on the master template substrate using the primary master template in a plurality of master template regions, wherein the periodically repeating lines in different ones of the master template regions extend in different directions.

50. The method of Example 40, wherein the periodically repeating lines formed on the primary master substrate has a sawtooth profile.

51. The method of Examples 40 or 50, wherein the periodically repeating lines formed on the primary master substrate comprise asymmetrically oriented side surfaces.

52. The method of any one of Examples 40 to 51, wherein the primary master substrate is a silicon substrate comprising a major surface having a (311) crystal orientation.

53. The method of Example 52, wherein the periodically repeating lines formed on the primary master substrate comprise a facet having a (111) crystal orientation.

54. The method of any one of Examples 40 to 53, wherein providing the primary master template comprises lithographically patterning and etching the periodically repeating lines in a silicon substrate.

55. The method of Example 54, wherein etching the silicon substrate comprises wet etching.

56. The method of any one of Examples 40 to 51, wherein providing the primary master template comprises forming the periodically repeating lines comprising a polymeric material and coating the periodically repeating lines with a dielectric material.

57. The method of any one of Examples 40 to 56, wherein the periodically repeating lines in different ones of the master template regions extend in non-orthogonal directions.

58. The method of any one of Examples 40 to 57, wherein the periodically repeating lines in different ones of the master template regions extend in radially symmetric directions with respect to a central axis of the master template substrate.

59. The method of any one of Examples 40 to 58, wherein imprinting periodically repeating lines on the master template substrate comprises imprinting in at least four master template regions.

60. The method of any one of Examples 40 to 59, wherein the periodically repeating lines formed on the master template substrate have a sawtooth profile.

61. The method of any one of Examples 49 to 60, wherein the periodically repeating lines formed on the master template substrate comprise symmetric opposing side surfaces forming similar angles with respect to a plane of the master template substrate 62. The method of any one of Examples 40 to 60, wherein the periodically repeating lines formed on the master template substrate comprise asymmetric opposing side surfaces forming different angles with respect to a plane of the master template substrate.

63. The method of any one of Examples 40 to 61, wherein the periodically repeating lines formed on the master template substrate comprise opposing side surfaces having different slopes with respect to a major surface plane of the master template substrate.

64. The method of any one of Examples 40 to 63, wherein the periodically repeating lines formed on the master template substrate comprise a side surface having a stepped structure.

65. The method of any one of Examples 40 to 64, wherein the periodically repeating lines formed on the master template substrate comprise a polymeric material.

66. The method of any one of Examples 40 to 65, wherein the periodically repeating lines formed on the master template substrate comprise a dielectric material.

67. The method of any one of Examples 40 to 66, further comprising coating the periodically repeating lines formed on the master template substrate with a dielectric material.

68. The method of any one of Examples 40 to 66, further comprising coating the periodically repeating lines formed on the master template substrate with a metal oxide or a metal nitride.

69. The method of any one of Examples 40 to 66, further comprising coating the periodically repeating lines formed on the master template substrate with a metal or a metal alloy.

70. The method of any one of Examples 49 to 69, further comprising transferring a pattern corresponding to the periodically repeating lines into the master template substrate.

71. The method of Example 70, wherein transferring the pattern comprises dry etching the master template substrate.

72. The method of Example 71, wherein dry etching comprises locally dry etching the master template regions.

73. The method of any one of Examples 49 to 72, wherein the master template regions are configured for imprinting a blazed diffraction grating comprising an incoupling grating configured to incouple light into a waveguide.

74. The method of any one of Examples 49 to 72, wherein the master template regions are configured for imprinting a blazed diffraction grating comprising an outcoupling grating configured to outcouple light from a waveguide.

75. The method of any one of Examples 49 to 72, wherein the master template regions are configured for imprinting a blazed diffraction grating comprising a light distributing element configured to distribute and propagate light within a waveguide towards an outcoupling element.

76. The method of any one of Examples 49 to 72, wherein the master template regions are configured for imprinting a blazed diffraction grating that serves as a combined outcoupling grating and light distributing element configured to distribute and propagate light within a waveguide and further configured to outcouple the light from the waveguide.

77. The method of any one of Examples 49 to 72, wherein the master template regions are configured for imprinting a blazed diffraction grating comprising a plurality of straight lines.

78. The method of any one of Examples 49 to 72, wherein the master template regions are configured for imprinting a blazed diffraction grating comprising a plurality of discontinuous lines.

79. The method of any one of Examples 49 to 72, wherein the master template regions are configured for imprinting a blazed diffraction grating comprising a plurality of pillars protruding from a surface of the grating substrate 80. The method of any one of Examples 49 to 72, wherein the master template regions are configured for imprinting a blazed diffraction grating comprising a plurality of straight lines, wherein at least some of the straight lines have different widths.

81. The method of any one of Examples 49 to 72, wherein the master template regions are configured for imprinting a blazed diffraction grating comprising diffractive features arranged as a one-dimensional (1D) array having a periodicity in one lateral direction.

82. The method of Example 81, wherein the 1D array serves as a 1D grating configured to diffract light preferentially in one direction.

83. The method of any one of Examples 49 to 72, wherein the master template regions are configured for imprinting a blazed diffraction grating comprising diffractive features arranged as a two-dimensional (2D) array having periodicities in two lateral directions.

84. The method of Example 83, wherein the 2D array serves as a 2D grating configured to diffract light preferentially in two directions.

85. The method of Example 83, wherein the 2D array comprises the same number of diffractive features in two different lateral directions.

86. A method of fabricating a diffraction grating, the method comprising:
providing a master template substrate;
imprinting periodically repeating lines on the master template substrate in one or more master template regions, wherein the periodically repeating lines are formed of a first material;
coating the periodically repeating lines with a second material having a greater hardness than the first material; and
using one or more master template regions as a master template to imprint one or more blazed diffraction grating patterns on a grating substrate.

87. The method of Example 86, wherein imprinting the periodically repeating lines comprises imprinting in a plurality of master template regions, wherein the periodically repeating lines in different ones of the master template regions extend in different directions.

88. The method of Examples 86 or 87, wherein the periodically repeating lines in different ones of the master template regions extend in different radial directions with respect to a central axis of the master template substrate.

89. The method of any one of Examples 86 to 88, wherein imprinting periodically repeating lines on the master template substrate comprises imprinting in at least four master template regions.

90. The method of any one of Examples 86 to 89, wherein the periodically repeating lines formed on the master template substrate comprise symmetric opposing side surfaces forming similar angles with respect to a plane of the master template substrate 91. The method of any one of Examples 86 to 89, wherein the periodically repeating lines formed on the master template substrate comprise asymmetric opposing side surfaces forming different angles with respect to a plane of the master template substrate.

92. The method of any one of Examples 86 to 91, wherein the periodically repeating lines formed on the master template comprise a polymeric material.

93. The method of any one of Examples 86 to 91, wherein the periodically repeating lines formed on the master template substrate comprise a dielectric material.

94. The method of any one of Examples 86 to 91, further comprising coating the periodically repeating lines formed on the master template substrate with a dielectric material.

95. The method of any one of Examples 86 to 91, further comprising coating the periodically repeating lines formed on the master template substrate with a metal oxide or a metal nitride.

96. The method of any one of Examples 86 to 91, further comprising coating the periodically repeating lines formed on the master template substrate with a metal or a metal alloy.

97. The method of any one of Examples 86 to 96, wherein the blazed diffraction grating comprises an outcoupling grating configured to outcouple light from a waveguide.

98. The method of any one of Examples 86 to 96, wherein the blazed diffraction grating comprises a light distributing element configured to distribute and propagate light within a waveguide towards an outcoupling element.

99. The method of any one of Examples 86 to 96, wherein the blazed diffraction grating serves as a combined outcoupling grating and light distributing element configured to distribute and propagate light within the waveguide and further configured to outcouple the light from the waveguide.

100. The method of any one of Examples 86 to 99, wherein the one or more blazed diffraction grating patterns comprise a plurality of straight lines.

101. The method of any one of Examples 86 to 99, wherein the one or more blazed diffraction grating patterns comprise a plurality of discontinuous lines.

102. The method of any one of Examples 86 to 99, wherein the one or more blazed diffraction grating patterns comprise a plurality of pillars protruding from a surface of the grating substrate 103. The method of any one of Examples 86 to 99, wherein the one or more blazed diffraction grating patterns comprise a plurality of straight lines, wherein at least some of the straight lines have different widths.

104. The method of any one of Examples 86 to 99, wherein the one or more blazed diffraction grating patterns comprise diffractive features arranged as a one-dimensional (1D) array having a periodicity in one lateral direction.

105. The method of Example 104, wherein the 1D array serves as a 1D grating configured to diffract light preferentially in one direction.

106. The method of any one of Examples 86 to 99, wherein the one or more blazed diffraction grating patterns comprise diffractive features arranged as a two-dimensional (2D) array having periodicities in two lateral directions.

107. The method of Example 106, wherein the 2D array serves as a 2D grating configured to diffract light preferentially in two directions.

108. The method of Example 106, wherein the 2D array comprises the same number of diffractive features in two different lateral directions.

109. The method of any one of Examples 1 to 48, wherein the grating substrate has a refractive index greater than 1.9.

110. The method of any one of Examples 1 to 48, wherein the grating substrate is formed of $ZrO_2$, $TiO_2$, SiC, or a Li-based oxide.

111. The method of any one of Examples 86 to 108, wherein the grating substrate has a refractive index greater than 1.9.

112. The method of any one of Examples 86 to 108, wherein the grating substrate is formed of $ZrO_2$, $TiO_2$, SiC, or a Li-based oxide.

ADDITIONAL CONSIDERATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A method of fabricating a blazed diffraction grating, the method comprising:
providing a master template substrate;
imprinting periodically repeating lines on the master template substrate in a plurality of master template regions, wherein the periodically repeating lines in different ones of the master template regions extend in different radial directions with respect to a central axis of the master template substrate; and
using at least one of the master template regions as a master template to imprint at least one blazed diffraction grating pattern on a grating substrate.

2. The method of claim 1, wherein the periodically repeating lines in different ones of the master template regions extend in non-orthogonal directions.

3. The method of claim 1, wherein imprinting periodically repeating lines on the master template substrate comprises imprinting in at least four master template regions.

4. The method of claim 1, wherein imprinting the periodically repeating lines comprises imprinting over a silicon surface of the master template substrate.

5. The method of claim 1, wherein imprinting the periodically repeating lines comprises imprinting over a silicon oxide surface of the master template substrate.

6. The method of claim 1, wherein imprinting the periodically repeating lines on the master template substrate comprises serially imprinting in different ones of the plurality of master template regions using the same primary master template.

7. The method of claim 1, wherein the periodically repeating lines formed on the master template substrate has a sawtooth profile.

8. The method of claim 1, wherein the periodically repeating lines formed on the master template substrate comprise symmetric opposing side surfaces forming similar angles with respect to a plane of the master template substrate.

9. The method of claim 1, wherein the periodically repeating lines formed on the master template substrate comprise asymmetric opposing side surfaces forming different angles with respect to a plane of the master template substrate.

10. The method of claim 1, wherein the periodically repeating lines formed on the master template substrate comprise a side surface having a stepped structure.

11. The method of claim 1, wherein the periodically repeating lines formed on the master template substrate comprise a polymeric material.

12. The method of claim 1, wherein the periodically repeating lines formed on the master template substrate comprise a dielectric material.

13. The method of claim 1, further comprising coating the periodically repeating lines formed on the master template substrate with a dielectric material.

14. The method of claim 1, further comprising coating the periodically repeating lines formed on the master template substrate with a metal oxide or a metal nitride.

15. The method of claim 1, further comprising coating the periodically repeating lines formed on the master template substrate with a metal or a metal alloy.

16. The method of claim 1, further comprising transferring a pattern corresponding to the periodically repeating lines into the master template substrate.

17. The method of claim 16, wherein transferring the pattern comprises using the periodically repeating lines as a partial mask to dry etch the master template substrate.

18. The method of claim 17, wherein dry etching comprises locally dry etching the master template regions.

19. The method of claim 1, wherein imprinting the periodically repeating lines comprises imprinting using a primary master template comprising periodically repeating lines formed on a primary master substrate.

20. The method of claim 1, wherein the different radial directions are not associated with crystallographic directions of the master template substrate.

* * * * *